US008852730B2

(12) United States Patent
Nair et al.

(10) Patent No.: US 8,852,730 B2
(45) Date of Patent: *Oct. 7, 2014

(54) MELT-EXTRUDED SUBSTRATE FOR USE IN THERMOFORMED ARTICLES

(75) Inventors: Kamlesh P. Nair, Florence, KY (US); Steven D. Gray, Mequon, WI (US); Camilo Cano, Union, KY (US)

(73) Assignee: Ticona LLC, Florence, KY (US)

(*) Notice: Subject to any disclaimer, the term of this patent is extended or adjusted under 35 U.S.C. 154(b) by 16 days.

This patent is subject to a terminal disclaimer.

(21) Appl. No.: 13/594,919

(22) Filed: Aug. 27, 2012

(65) Prior Publication Data

US 2013/0052446 A1  Feb. 28, 2013

Related U.S. Application Data

(60) Provisional application No. 61/528,401, filed on Aug. 29, 2011, provisional application No. 61/528,424, filed on Aug. 29, 2011, provisional application No. 61/664,881, filed on Jun. 27, 2012, provisional application No. 61/664,891, filed on Jun. 27, 2012, provisional application No. 61/664,925, filed on Jun. 27, 2012.

(51) Int. Cl.

| C09K 19/38 | (2006.01) |
|---|---|
| B29C 43/24 | (2006.01) |
| C09K 19/48 | (2006.01) |
| C09K 19/32 | (2006.01) |
| C09K 19/34 | (2006.01) |
| C09K 19/30 | (2006.01) |
| C09K 19/22 | (2006.01) |
| C08K 5/20 | (2006.01) |
| C09K 19/04 | (2006.01) |

(52) U.S. Cl.
CPC ......... *C09K 19/22* (2013.01); *C09K 2019/0481* (2013.01); *C09K 19/48* (2013.01); *C09K 19/322* (2013.01); *C09K 19/3444* (2013.01); *C09K 19/3086* (2013.01); *C08K 5/20* (2013.01)
USPC ............................................. 428/220; 264/571

(58) Field of Classification Search
CPC ................. C09K 12/22; C09K 19/322; C09K 2019/0481
USPC ............................................ 428/220; 264/571
See application file for complete search history.

(56) References Cited

U.S. PATENT DOCUMENTS

| 4,002,600 A | 1/1977 | Habermeier |
|---|---|---|
| 4,038,416 A | 7/1977 | Mori et al. |

(Continued)

FOREIGN PATENT DOCUMENTS

| EP | 0 055 480 | 7/1982 |
|---|---|---|
| EP | 0 071 968 | 2/1983 |

(Continued)

OTHER PUBLICATIONS

Abstract of European Patent—EP0523326, Jan. 20, 1993, 1 page.

(Continued)

*Primary Examiner* — Michael Pepitone
*Assistant Examiner* — Michael A Salvitti
(74) *Attorney, Agent, or Firm* — Dority & Manning, P.A.

(57) ABSTRACT

A melt-extruded substrate that can be readily thermoformed into a shaped, three-dimensional article is provided. The substrate is formed from a polymer composition that contains a thermotropic liquid crystalline polymer and a unique aromatic amide oligomer. The present inventors have discovered that the oligomer can help increase the "low shear" complex viscosity of the resulting polymer. The ability to achieve enhanced low shear viscosity values can lead to polymer compositions with an increased melt strength, which allows the resulting substrate to better maintain its shape during thermoforming without exhibiting a substantial amount of sag. Due to its relatively high degree of melt strength, the polymer composition is particularly well suited for forming thin extruded substrates for use in thermoforming processes.

29 Claims, 5 Drawing Sheets

(56) References Cited

U.S. PATENT DOCUMENTS

| | | | |
|---|---|---|---|
| 4,083,829 A | 4/1978 | Calundann et al. |
| 4,132,840 A | 1/1979 | Hugl et al. |
| 4,161,470 A | 7/1979 | Calundann et al. |
| 4,163,099 A | 7/1979 | Buxbaum et al. |
| 4,184,996 A | 1/1980 | Calundann |
| 4,219,461 A | 8/1980 | Calundann |
| 4,256,624 A | 3/1981 | Calundann |
| 4,279,803 A | 7/1981 | Calundann |
| 4,318,841 A | 3/1982 | East et al. |
| 4,330,457 A | 5/1982 | East et al. |
| 4,330,668 A | 5/1982 | Hideo et al. |
| 4,337,190 A | 6/1982 | Calundann |
| 4,339,375 A | 7/1982 | Calundann et al. |
| 4,351,917 A | 9/1982 | Calundann et al. |
| 4,351,918 A | 9/1982 | Charbonneau et al. |
| 4,355,132 A | 10/1982 | East et al. |
| 4,355,134 A | 10/1982 | Charbonneau et al. |
| 4,375,530 A | 3/1983 | Hay et al. |
| 4,387,210 A | 6/1983 | Katoh et al. |
| 4,393,191 A | 7/1983 | East |
| 4,421,908 A | 12/1983 | East |
| 4,429,105 A | 1/1984 | Charbonneau |
| 4,434,262 A | 2/1984 | Buckley et al. |
| 4,473,682 A | 9/1984 | Calundann et al. |
| 4,511,709 A | 4/1985 | Yoo et al. |
| 4,522,974 A | 6/1985 | Calundann et al. |
| 4,563,508 A | 1/1986 | Cottis et al. |
| 4,581,399 A | 4/1986 | Yoon |
| 4,611,025 A | 9/1986 | Akkapeddi et al. |
| 4,650,836 A | 3/1987 | George et al. |
| 4,778,858 A | 10/1988 | Ginnings |
| 4,831,104 A | 5/1989 | Aya et al. |
| 4,851,562 A | 7/1989 | de Jonge et al. |
| 4,904,752 A | 2/1990 | Kanoe et al. |
| 4,952,662 A | 8/1990 | Finke et al. |
| 4,968,737 A | 11/1990 | Finke et al. |
| 4,980,444 A | 12/1990 | de Jonge et al. |
| 4,980,504 A | 12/1990 | de Jonge et al. |
| 5,093,464 A | 3/1992 | Yoon et al. |
| 5,102,935 A * | 4/1992 | Heinz et al. ............ 524/219 |
| 5,120,820 A | 6/1992 | Fujiwara et al. |
| 5,162,489 A | 11/1992 | de Jonge et al. |
| 5,171,823 A | 12/1992 | Charbonneau et al. |
| 5,204,443 A | 4/1993 | Lee et al. |
| 5,221,730 A | 6/1993 | Morris et al. |
| 5,237,038 A | 8/1993 | Morris et al. |
| 5,258,470 A | 11/1993 | Poll et al. |
| 5,271,865 A | 12/1993 | Hittich et al. |
| 5,298,593 A | 3/1994 | Fujiwara et al. |
| 5,324,795 A | 6/1994 | Suenaga |
| 5,332,800 A * | 7/1994 | Arduengo et al. ........... 528/371 |
| 5,334,343 A | 8/1994 | Po' et al. |
| 5,352,746 A | 10/1994 | Asai et al. |
| 5,446,124 A | 8/1995 | Niwano et al. |
| 5,480,907 A | 1/1996 | Hayashi et al. |
| 5,496,893 A | 3/1996 | Gagné et al. |
| 5,500,294 A | 3/1996 | Sakumoto et al. |
| 5,510,189 A | 4/1996 | Sakumoto et al. |
| 5,534,187 A | 7/1996 | Miyazawa et al. |
| 5,541,240 A | 7/1996 | Makhija et al. |
| 5,541,267 A * | 7/1996 | Akkapeddi et al. ........... 525/432 |
| 5,563,216 A | 10/1996 | Niwano et al. |
| 5,573,752 A | 11/1996 | Ranganathan et al. |
| 5,609,956 A | 3/1997 | Sakumoto et al. |
| 5,614,316 A | 3/1997 | Hashimoto et al. |
| 5,616,680 A | 4/1997 | Linstid, III |
| 5,766,507 A | 6/1998 | Nakai |
| 5,779,936 A | 7/1998 | Miyasawa et al. |
| 5,976,406 A | 11/1999 | Nagano et al. |
| 5,997,765 A | 12/1999 | Furuta et al. |
| 6,114,492 A | 9/2000 | Linstid, III et al. |
| 6,294,618 B1 | 9/2001 | Soelch |
| 6,312,772 B1 | 11/2001 | Kuder et al. |
| 6,376,076 B1 * | 4/2002 | Ohbe et al. .............. 428/402 |
| 6,498,274 B1 | 12/2002 | Brown et al. |
| 6,514,611 B1 | 2/2003 | Shepherd et al. |
| 6,613,847 B2 | 9/2003 | Soelch |
| 6,649,730 B2 | 11/2003 | Okamoto et al. |
| 6,656,386 B2 | 12/2003 | Suenaga et al. |
| 6,680,002 B2 | 1/2004 | Yamauchi et al. |
| 6,702,956 B2 * | 3/2004 | Maeda et al. ............ 252/299.67 |
| 6,740,728 B2 | 5/2004 | Ding et al. |
| 6,755,992 B2 | 6/2004 | Okamoto et al. |
| 7,179,401 B2 | 2/2007 | Ueno et al. |
| 7,238,714 B2 | 7/2007 | Nakao et al. |
| 7,335,318 B2 | 2/2008 | Asahara et al. |
| 7,343,675 B2 | 3/2008 | Smith et al. |
| 7,344,657 B2 | 3/2008 | Okamoto et al. |
| 7,393,467 B2 | 7/2008 | Asahara et al. |
| 7,405,250 B2 | 7/2008 | Kim |
| 7,507,784 B2 | 3/2009 | Dingemans et al. |
| 7,534,914 B2 | 5/2009 | Koike et al. |
| 7,592,413 B2 | 9/2009 | Citron et al. |
| 7,648,748 B2 | 1/2010 | Nakane et al. |
| 7,754,717 B2 | 7/2010 | Dimauro et al. |
| 7,759,344 B2 | 7/2010 | Booker et al. |
| 7,790,793 B2 | 9/2010 | Schmidt et al. |
| 7,795,315 B2 | 9/2010 | Chen et al. |
| 7,803,307 B2 | 9/2010 | Zimmerman |
| 7,824,572 B2 | 11/2010 | Okamoto |
| 7,825,176 B2 | 11/2010 | Kim et al. |
| 8,034,255 B2 | 10/2011 | Goldfinger |
| 8,084,476 B2 | 12/2011 | Koike et al. |
| 8,084,637 B2 | 12/2011 | Chopra et al. |
| 8,142,683 B2 | 3/2012 | Murouchi et al. |
| 8,309,734 B2 | 11/2012 | Bissantz et al. |
| 2002/0132933 A1 * | 9/2002 | Dingemans et al. ......... 525/437 |
| 2004/0135118 A1 | 7/2004 | Waggoner |
| 2005/0209429 A1 * | 9/2005 | Dingemans et al. ............ 528/59 |
| 2006/0019110 A1 | 1/2006 | Sato et al. |
| 2006/0073306 A1 | 4/2006 | Nakane et al. |
| 2007/0106035 A1 | 5/2007 | Gomurashvili et al. |
| 2007/0185118 A1 | 8/2007 | Hooft Van Huijsduijnene et al. |
| 2007/0232594 A1 | 10/2007 | Yokoyama et al. |
| 2009/0001317 A1 | 1/2009 | Okamoto |
| 2009/0111950 A1 | 4/2009 | Yamazaki et al. |
| 2009/0275697 A1 | 11/2009 | Waggoner et al. |
| 2010/0130743 A1 | 5/2010 | Wada et al. |
| 2011/0071304 A1 | 3/2011 | Fujimaki et al. |
| 2011/0184188 A1 * | 7/2011 | Wada et al. ............... 548/262.2 |
| 2012/0022202 A1 | 1/2012 | Suh et al. |
| 2013/0048908 A1 * | 2/2013 | Gray et al. ............... 252/299.5 |
| 2013/0048909 A1 | 2/2013 | Nair et al. |
| 2013/0048910 A1 * | 2/2013 | Nair et al. ............... 252/299.5 |
| 2013/0048911 A1 * | 2/2013 | Nair et al. ............... 252/299.5 |
| 2013/0048914 A1 * | 2/2013 | Nair et al. ............... 252/299.62 |
| 2013/0052447 A1 * | 2/2013 | Grenci et al. ............... 428/220 |
| 2013/0053531 A1 * | 2/2013 | Nair et al. ............... 528/190 |
| 2013/0053532 A1 * | 2/2013 | Nair et al. ............... 528/193 |
| 2013/0053533 A1 * | 2/2013 | Nair et al. ............... 528/193 |
| 2013/0062558 A1 * | 3/2013 | Nair et al. ............... 252/299.5 |
| 2013/0155597 A1 * | 6/2013 | Luo et al. ............... 361/679.26 |
| 2013/0157033 A1 * | 6/2013 | Luo et al. ............... 428/220 |
| 2013/0158212 A1 * | 6/2013 | Luo et al. ............... 525/537 |
| 2013/0190435 A1 * | 7/2013 | Skoumal et al. ............ 524/229 |

FOREIGN PATENT DOCUMENTS

| | | |
|---|---|---|
| EP | 0 376 615 | 7/1990 |
| EP | 0 396 955 | 11/1990 |
| EP | 0 413 375 | 2/1991 |
| EP | 0 450 652 | 10/1991 |
| EP | 0 569 980 | 11/1993 |
| EP | 0 852 249 | 7/1998 |
| EP | 1 095 930 | 5/2001 |
| EP | 1 792 942 | 6/2007 |
| GB | 2 158 832 | 11/1985 |
| WO | WO 95/33803 | 12/1995 |
| WO | WO 98/22103 | 5/1998 |
| WO | WO 2004/058851 | 7/2004 |
| WO | WO 2007/038373 | 4/2007 |

OTHER PUBLICATIONS

Abstract of German Patent—DE2041773, 1972, 1 page.
Abstract of German Patent—DE3914048, Mar. 22, 1990, 2 pages.

(56) References Cited

OTHER PUBLICATIONS

Abstract of German Patent—DE4017685, Dec. 5, 1991, 1 page.
Abstract of German Patent—DE102005030391, Jan. 26, 2006, 2 pages.
Abstract of Japanese Patent—JP2004182748A, Jul. 2, 2004, 1 page.
Abstract of Japanese Patent—JP2005248052A, Sep. 15, 2005, 1 page.
Abstract of Japanese Patent—JP2005298772A, Oct. 27, 2005, 1 page.
Abstract of Japanese Patent—JP2006225644, Aug. 31, 2006, 1 page.
Abstract of Japanese Patent—JP2006257047, Sep. 28, 2006, 1 page.
Abstract of Japanese Patent—JP2007238851A, Sep. 20, 2007, 1 page.
Abstract of Japanese Patent—JP2009108179A, May 21, 2009, 1 page.
Abstract of Japanese Patent—JP2009108180A, May 21, 2009, 1 page.
Abstract of Japanese Patent—JP2010174114A, Aug. 12, 2010, 1 page.
Abstract of Japanese Patent—JPH01115926, May 9, 1989, 1 page.
Abstract of Japanese Patent—JPH02151626, Jun. 11, 1990, 1 page.
Abstract of Japanese Patent—JPH02240134, Sep. 25, 1990, 1 page.
Abstract of Japanese Patent—JPH02240138, Sep. 25, 1990, 1 page.
Abstract of Japanese Patent—JPH03072559, Mar. 27, 1991, 1 page.
Abstract of Japanese Patent—JPH03095260, Apr. 19, 1991, 2 pages.
Abstract of Japanese Patent—JPH06347770A, Dec. 22, 1994, 2 pages.
Abstract of Japanese Patent —JPH0673239, Mar. 15, 1994, 1 page.
Abstract of Japanese Patent—JPH09143347A, Jun. 3, 1997, 1 page.
Abstract of Japanese Patent—JPH09249813A, Sep. 22, 1997, 2 pages.
Abstract of Japanese Patent—JPH1160927A, Mar. 5, 1999, 2 pages.
Abstract of Japanese Patent—JPS58219233, Dec. 20, 1983, 2 pages.
Abstract of Japanese Patent—JPS5861145, Apr. 12, 1983, 1 page.
Abstract of Japanese Patent—JPS5861146, Apr. 12, 1983, 1 pages.
Abstract of Japanese Patent—JPS5883048, May 18, 1983, 2 pages.
Abstract of Japanese Patent—JPS5893718, Jun. 3, 1983, 2 pages.
Abstract of Japanese Patent—JPS59196364, Nov. 7, 1984, 1 page.
Abstract of Japanese Patent—JPS6049026, Mar. 18, 1984, 2 pages.
Abstract of Japanese Patent—JPS63137950, Jun. 9, 1988, 1 page.
Abstract of Japanese Patent—JPS63280730, Nov. 17, 1988, 2 pages.
Abstract of Japanese Patent—JPS63280731, Nov. 17, 1998, 1 page.
Abstract of Japanese Patent—JPS63280732, Nov. 17, 1988, 2 pages.
Abstract of Polish Patent—PL92807, 1977, 1 page.
Abstract of Taiwanese Patent—TW397859B, Jul. 11, 2000, 1 page.
Abstract of Article—Shaul M. Aharoni, "Hydrogen-Bonded Highly Regular Strictly Alternating Aliphatic-Aromatic Liquid Crystalline Poly(ester amides)," *Macromolecules*, Vo. 21, 1988, pp. 1941-1961.
Abstract of Article and Article—Ishida et al., "Unusual Thermal Behavior of the Aromatic Polyamide Dendrons," *Kobunshi Ronbunshu*, vol. 57, No. 12, Dec. 2000, pp. 825-829.
Abstract of Article—Kajiyama et al., "Synthesis and properties of multiblock copolymers based on polydimethylsiloxane and piperazine-aromatic polyamides," *Journal of Applied Polymer Science*, vol. 39, Issue 8, Apr. 1990, pp. 1699-1708.

Abstract of Article—Preston et al., "Synthesis of high-molecular-weight rodlike polyamides and block copolymers," *Journal of Polymer Science: Polymer Chemistry Edition*, vol. 20, Issue 11, Nov. 1982, pp. 3241-3249.
Abstract of Article—Ueda et al., "Diphenyl (2,3-Dihydro-2-thioxo-3-benzoxazolyl)phosphonate: A New, Reactive Activating Agent for the Synthesis of Amides and Polyamides," *Macromolecules*, vol. 21, No. 1, 1988, pp. 19-24.
Abstract of Article—Ueda et al., "Synthesis of Sequential Polyamide by Direct Polycondensation," *Polymer Journal*, vol. 23, No. 3, 1991, pp. 167-176.
Article—Shaul M. Aharoni, "Monodisperse Rodlike Oligomers and Their Mesomorphic Higher Molecular Weight Homologues," *Macromolecules*, vol. 20, No. 8, 1987, pp. 2010-2017.
Article—Dutta et al., "Polymer Blends Containing Liquid Crystals: A Review," *Polymer Engineering and Science*, Mid-Sep. 1990, vol. 30, No. 17, pp. 1005-1018.
Article—Gale et al., "Conformational Control of Selectivity and Stability in Hybrid Amide/Urea Macrocycles," *Chem. Eur. J.*, vol. 13, 2007, pp. 3320-3329.
Article—Han et al., "A Change in Mechanism from Acidolysis to Phenolysis in the Bulk Copolymerization of 4-Acetoxybenzoic Acid and 6-Acetoxy-2-naphthoic Acid," *Macromolecules*, 1996, vol. 29, No. 26, pp. 8313-8320.
Article—Kuz'min et al., "Kinetics of Acylation of Anilines Monosubstituted in the Ring by Benzoyl Chloride in N, N-Dimethylacetamide," *Zhurnal Organicheskoi Khimii*, vol. 17, No. 11, pp. 2394-2396, 1982.
Article—Li et al., "Modification of rheological properties of a thermotropic liquid crystalline polymer by melt-state reactive processing," *Polymer*, 2012, pp. 1-8.
Article—Oswal et al., "Synthesis and Characterization of Linear Aromatic Polyester-amides from Diacid Chlorides and Aminophenols," *Iranian Polymer Journal*, vol. 13, No. 3, 2004, pp. 205-212.
Article—Quamara et al., "Thermally stimulated depolarization current Investigations of copolyesteramide (Vectra B 950) polymer liquid crystal," *Materials Science—Poland*, vol. 28, No. 3, 2010, pp. 679-691.
Article—Siegmann et al., "Polyblends containing a liquid crystalline polymer," *Polymer*, 1985, vol. 26, August (conference issue), pp. 1325-1330.
Article—Washio et al., "Facile Synthesis of Polyamide Dendrimers from Unprotected $AB_2$ Building Blocks: Dumbbell-Shaped Dendrimer, Star-Shaped Dendrimer, and Dendrimer with a Carboxylic Acid at the Core," *Macromolecules*, vol. 38, No. 6, 2005, pp. 2237-2246.
Paper—Okamoto et al., "Newly Developed LCP film Fabricated by Solvent-Casting Method," *Sumitomo Chemical Co., Ltd.*, Translated from R&D Report, Sumitomo Kagaku, vol. 2005-I, 11 pages.
Paper—Olena Rudko, "Liquid crystalline polymers. Uniaxial-biaxial nematic phase transition," *Term Paper for Physics 498, Emergent States of Matter*, May 6, 2002, pp. 112 (Department of Physics, University of Illinois at Urbana-Champaign).
Search Report and Written Opinion for PCT/US2012/052434 dated Feb. 15, 2013, 11 pages.

\* cited by examiner

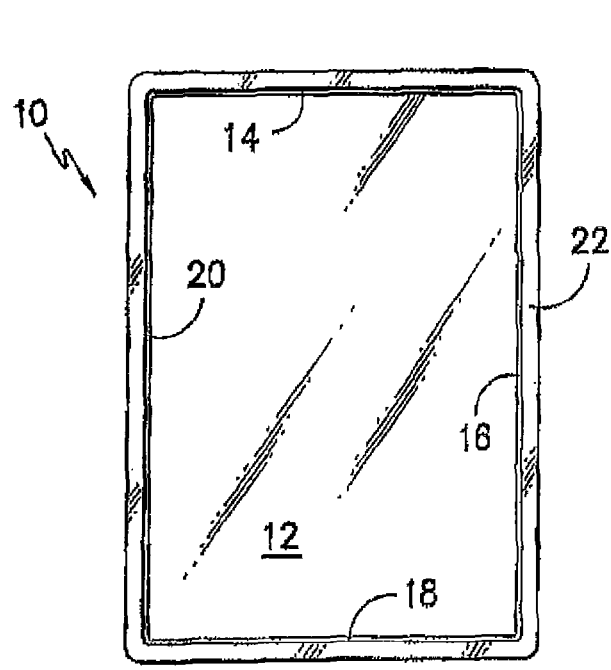
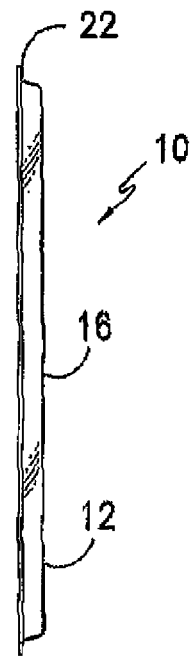
FIG. 6      FIG. 7
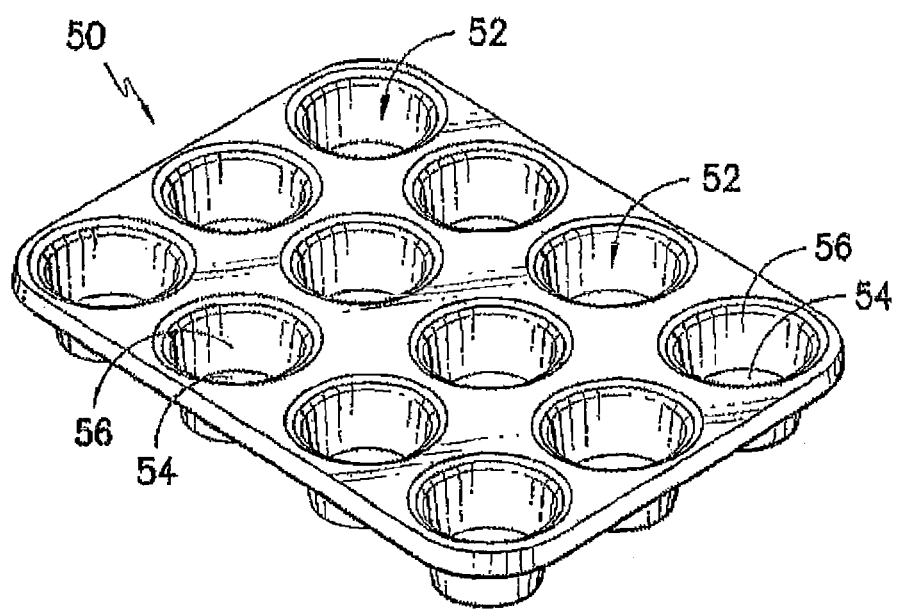
FIG. 8

MELT-EXTRUDED SUBSTRATE FOR USE IN THERMOFORMED ARTICLES

RELATED APPLICATIONS

The present application claims priority to U.S. provisional application Ser. Nos. 61/528,401 and 61/528,424, filed on Aug. 29, 2011, and 61/664,881, 61/664,891, and 61/664,925, filed on Jun. 27, 2012, which are incorporated herein in their entirety by reference thereto.

BACKGROUND OF THE INVENTION

Many baked goods, such as rolls, cookies, pizzas, etc., are baked on cookware or bakeware. The bakeware can be flat, such as a baking sheet, or can be shaped, such as bakeware containing domed portions or cavities. Conventional cookware and bakeware articles have been made from metals. For example, aluminum, copper, cast iron and stainless steel have all been used to produce the above described articles. Unfortunately, food stuffs have a tendency to stick to metal surfaces. To remedy this problem, modern metal cooking pans and baking pans are frequently coated with a substance that minimizes the possibility of food sticking to the surface of the utensil. Coatings that have been used in the past include, for instance, polytetrafluoroethylene (PTFE) or silicone. Although these coatings can deliver non-stick properties, they have a tendency to break down, peel off and degrade over time requiring either replacement or periodic recoating of the metal cookware and bakeware. In addition, metal bakeware also tends to be relatively heavy and can corrode. Metal bakeware can also product loud and noisy sounds when handled.

In the past, the use of non-metallic materials has been investigated for cookware and bakeware articles. For example, wholly aromatic polyester resins have been tried that inherently possess good anti-stick properties. Although various advantages and benefits can be obtained by constructing cookware and bakeware from such polymers, various drawbacks still remain. For instance, in the past, the cookware that contained aromatic liquid crystal polymers was formed through an injection molding process. Although injection molding is an effective way for producing some cookware articles, it is generally not satisfactory for producing cookware articles having a large surface area in relation to thickness. Injection molding planar structures, for instance, can lead to tensions in the molded part due to the processing speed. For example, when filling large and relatively thin-walled molds, high injection pressures are required that unavoidably create residual stress that causes warpage or the formation of blisters. Attempts have been made to reduce stress by using multiple injection points on the mold, but this can create seams that form weak points in the article.

As such, a need currently exists for an improved technique for forming thin articles, such as those used in cookware or bakeware.

SUMMARY OF THE INVENTION

In accordance with one embodiment of the present invention, a melt-extruded substrate is disclosed that has a thickness of about 20 millimeters or less for use in thermoforming an article. The substrate comprises a polymer composition that includes a thermotropic liquid crystalline polymer polymerized in the presence of an aromatic amide oligomer having the following general formula (I):

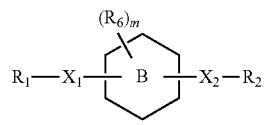

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O); and
$R_1$ and $R_2$ are independently selected from aryl, heteroaryl, cycloalkyl, and heterocyclyl.

In accordance with another embodiment of the present invention, a method for forming a thin substrate having a thickness of about 20 millimeters or less is disclosed. The method comprises extruding a polymer composition to produce a precursor sheet and thereafter, calendaring the precursor sheet to form the thin substrate, wherein the polymer composition includes a thermotropic liquid crystalline polymer polymerized in the presence of an aromatic amide oligomer.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which:

FIG. 6 is a plan view of one embodiment of a cookware tray made in accordance with one embodiment of the present invention;

FIG. 7 is a side view of the cookware tray illustrated in FIG. 1;

FIG. 8 is an alternative embodiment of a cookware tray made in accordance with one embodiment of the present invention;

DETAILED DESCRIPTION

Definitions

Figure 1:
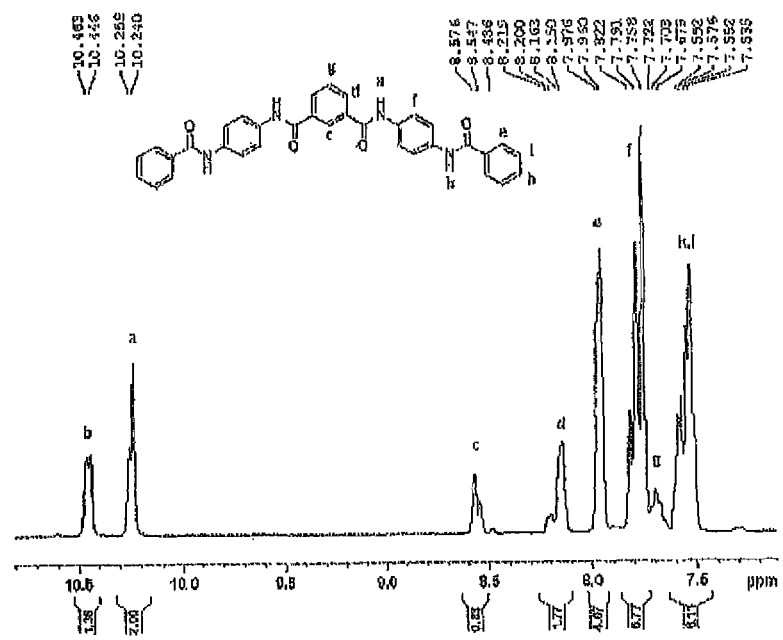
FIG. 1 is the Proton NMR characterization for N1,N3-bis (4-benzamidophenyl)benzene-1,3-dicarboxamide (Compound C2)

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl($CH_3$), ethyl($CH_3CH_2$), n-propyl ($CH_3CH_2CH_2$), isopropyl(($CH_3$)$_2$CH), n-butyl ($CH_3CH_2CH_2CH_2$), isobutyl(($CH_3$)$_2$CHCH$_2$), sec-butyl (($CH_3$)($CH_3CH_2$)CH), t-butyl(($CH_3$)$_3$C), n-pentyl ($CH_3CH_2CH_2CH_2CH_2$), and neopentyl(($CH_3$)$_3$CCH$_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g. 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C<ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g. imidazolyl) and multiple ring systems (e.g. benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g. 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g. decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other functional groups as is known in the art. For example, an alkynyl, aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

"Liquid Crystalline Polymer" generally refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). The polymer may also be fully crystalline or semi-crystalline in nature.

Description

It is to be understood by one of ordinary skill in the art that the present discussion is a description of exemplary embodiments only, and is not intended as limiting the broader aspects of the present invention.

Generally speaking, the present invention is directed to a melt-extruded substrate that can be readily thermoformed into a shaped, three-dimensional article. The substrate may be in the form of a film, sheet, web, etc., which is thin in nature and has a thickness of about 20 millimeters or less, in some embodiments from about 0.05 to about 15 millimeters, in some embodiments from about 0.1 to about 10 millimeters, and in some embodiments, from about 0.2 to about 5 millimeters. The substrate is formed from a polymer composition that contains a thermotropic liquid crystalline polymer and a unique aromatic amide oligomer. The present inventors have discovered that the oligomer can help increase the "low shear" complex viscosity of the resulting polymer. For instance, the polymer may have a "low shear" complex viscosity of about 100 kilopascal-seconds ("kPa-s") or more, in some embodiments about 200 kPa-s or more, in some embodiments from about 300 kPa-s to about 2,000 kPa-s, and in some embodiments, from about 500 kPa-s to about 1,500 kPa-s, which may be determined by a parallel plate rheometer at an angular frequency of 0.15 radians per second, a temperature of 375° C., and at a constant strain amplitude of 1%.

The ability to achieve enhanced low shear viscosity values can lead to polymer compositions with an increased melt strength, which allows the resulting substrate to better maintain its shape during thermoforming without exhibiting a substantial amount of sag. Melt strength can be characterized by the engineering stress of a composition at a certain percent strain and at a relatively high temperature, such as at 300° C. As explained in more detail below, such testing may be performed in accordance with the ARES-EVF during which an extensional viscosity fixture ("EVF") is used on a rotational rheometer to allow the measurement of the material stress versus percent strain. Due to its relatively high degree of melt strength, the polymer composition is particularly well suited for forming thin extruded substrates for use in thermoforming processes.

I. Polymer Composition

A. Liquid Crystalline Polymer

Thermotropic liquid crystalline polymers that are employed in the melt-extruded substrate may include, for instance, aromatic polyesters, aromatic poly(esteramides), aromatic poly(estercarbonates), aromatic polyamides, etc., and may likewise contain repeating units formed from one or more aromatic hydroxycarboxylic acids, aromatic dicarboxylic acids, aromatic diols, aromatic aminocarboxylic acids, aromatic amines, aromatic diamines, etc., as well as combinations thereof. The precursor monomers used to form such polymers may generally vary as is known in the art. For example, monomer repeating units may be derived from one or more aromatic hydroxycarboxylic acids, aromatic dicarboxylic acids, aromatic diols, aromatic aminocarboxylic acids, aromatic amines, aromatic diamines, etc., as well as combinations thereof.

Aromatic polyesters, for instance, may be obtained by polymerizing (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic diol, as well as derivatives of any of the foregoing. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic diols include hydroquinone; resorcinol; 2,6-dihydroxynaphthalene; 2,7-dihydroxynaphthalene; 1,6-dihydroxynaphthalene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof. In one particular embodiment, the aromatic polyester contains monomer repeat units derived from 4-hydroxybenzoic acid and 2,6-hydroxynaphthoic acid. The synthesis aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

In one particular embodiment, for example, an aromatic polyester may be formed that contains monomer repeat units derived from 4-hydroxybenzoic acid and terephthalic acid ("TA") and/or isophthalic acid ("IA"). The monomer units derived from 4-hydroxybenzoic acid ("HBA") may constitute from about 40 mol. % to about 95 mol. %, in some embodiments from about 45 mol. % to about 90 mol. %, and in some embodiments, from about 50 mol. % to about 80 mol. % of the polymer, while the monomer units derived from terephthalic acid and/or isophthalic acid may each constitute from about 1 mol. % to about 30 mol. %, in some embodiments from about 2 mol. % to about 25 mol. %, and in some embodiments, from about 3 mol. % to about 20 mol. % of the polymer. Other monomeric units may optionally be employed, such as aromatic diols (e.g., 4,4'-biphenol, hydroquinone, etc.) and/or hydroxycarboxylic acids (e.g., 6-hydroxy-2-naphthoic acid). For example, monomer units derived from hydroquinone ("HQ"), 4,4'-biphenol ("BP"), and/or acetaminophen ("APAP") may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain monomer units derived from 6-hydroxy-2-naphthoic acid ("HNA") in an amount of from about 1 mol. % to about 30 mol. %, in some embodiments from about 2 mol. % to about 25 mol. %, and in some embodiments, from about 3 mol. % to about 20 mmol. % of the polymer.

Liquid crystalline polyesteramides may likewise be obtained by polymerizing (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups, as well as derivatives of any of the foregoing. Suitable aromatic amines and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide may contain monomer units derived from 2,6-hydroxynaphthoic acid, terephthalic acid, and 4-aminophenol. The monomer units derived from 2,6-hydroxynaphthoic acid may constitute from about 35% to about 85% of the polymer on a mole basis (e.g., 60%), the monomer units derived from terephthalic acid may constitute from about 5% to about 50% (e.g., 20%) of the polymer on a mole basis, and the monomer units derived from 4-aminophenol may constitute from about 5% to about 50% (e.g., 20%) of the polymer on a mole basis. Such aromatic polyesters are commercially available from Ticona, LLC under the trade designation VECTRA® B. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

Regardless of the particular constituents, the liquid crystalline polymer may be prepared by introducing the appropriate monomer(s) (e.g., aromatic hydroxycarboxylic acid, aromatic dicarboxylic acid, aromatic diol, aromatic amine, aromatic diamine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known in art. Acetylation may occur in a separate reactor vessel, or it may occur in situ within the polymerization reactor vessel. When separate reactor vessels are employed, one or more of the monomers may be introduced to the acetylation reactor and subsequently transferred to the melt polymerization reactor. Likewise, one or more of the monomers may also be directly introduced to the reactor vessel without undergoing pre-acetylation. Acetylation may be accomplished by adding an acetylating agent (e.g., acetic anhydride) to one or more of the monomers. One particularly suitable technique for acetylating monomers may include, for instance, charging precursor monomers (e.g., 4-hydroxybenzoic acid and 2,6-hydroxynaphthoic acid) and acetic anhydride into a reactor and heating the mixture to acetylize a hydroxyl group of the monomers (e.g., forming acetoxy).

Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon. After any optional acetylation is complete, the resulting composition may be melt-polymerized. Although not required, this is typically accomplished by transferring the acetylated monomer(s) to a separator reactor vessel for conducting a polycondensation reaction. If desired, one or more of the precursor monomers used to form the liquid crystalline polymer may be directly introduced to the melt polymerization reactor vessel without undergoing pre-acetylation. Other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. The catalyst is typically added to the acetylation reactor rather than the polymerization reactor, although this is by no means a requirement.

After melt-polymerization, the resulting polymer may be removed. In some embodiments, the polymer may also be subjected to a subsequent solid-state polymerization method to further increase its molecular weight. For instance, solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of about 200° C. to about 350° C., in some embodiments from about 225° C. to about 325° C., and in some embodiments, from about 250° C. to about 300° C. The polymerization time will of course vary based on the temperature and target molecular weight. In most cases, however, the solid-state polymerization time will be from about 2 to about 12 hours, and in some embodiments, from about 4 to about 10 hours.

B. Aromatic Amide Oligomer

One benefit of the aromatic amide flow aid is that it is not easily volatized or decomposed, which allows the additive to be processed at relatively high temperatures during the polymerization reaction. Without intending to be limited by theory, it is believed that active hydrogen atoms of the amide functional groups are capable of forming a hydrogen bond with the backbone of liquid crystalline polyesters or polyesteramides. Such hydrogen bonding strengthens the attachment of the oligomer to the liquid crystalline polymer matrix and thus minimizes the likelihood that it becomes volatilized during formation. In this regard, the oligomer generally possesses a high amide functionality so it is capable of undergoing a sufficient degree of hydrogen bonding with the liquid crystalline polymer. The degree of amide functionality for a given molecule may be characterized by its "amide equivalent weight", which reflects the amount of a compound that contains one molecule of an amide functional group and may be calculated by dividing the molecular weight of the compound by the number of amide groups in the molecule. For example, the aromatic amide oligomer may contain from 2 to 15, in some embodiments from 3 to 12, and in some embodiments, from 3 to 8 amide functional groups per molecule. The amide equivalent weight may likewise be from about 10 to about 1,000 grams per mole or less, in some embodiments from about 50 to about 500 grams per mole, and in some embodiments, from about 100 to about 300 grams per mole. The total weight of the oligomer is also high enough so that it can effectively increase the low shear viscosity of the polymer, yet not so high that polymerization is substantially inhibited. In this regard, the oligomer typically has a molecular weight of from about 325 to about 5,000 grams per mole, in some embodiments from about 350 to about 3,000 grams per mole, in some embodiments from about 375 to about 2,500 grams per mole, and in some embodiments, from about 400 to about 1,500 grams per mole.

While providing the benefits noted above, the aromatic amide oligomer does not generally form covalent bonds with the polymer backbone of the liquid crystalline polymer to any appreciable extent so that the mechanical properties of the polymer are not adversely impacted. To help better minimize reactivity, the oligomer typically contains a core formed from one or more aromatic rings (including heteroaromatic). The oligomer may also contain terminal groups formed from one or more aromatic rings. Such an "aromatic" oligomer thus possesses little, if any, reactivity with the base liquid crystalline polymer. For example, one embodiment of such an aromatic amide oligomer is provided below in Formula (I):

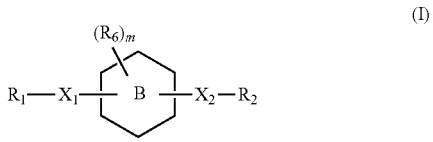

(I)

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

In certain embodiments, Ring B in Formula (I) above may be selected from the following:

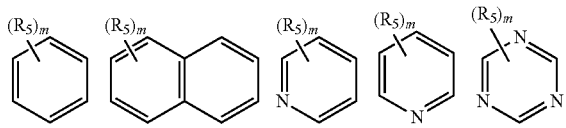

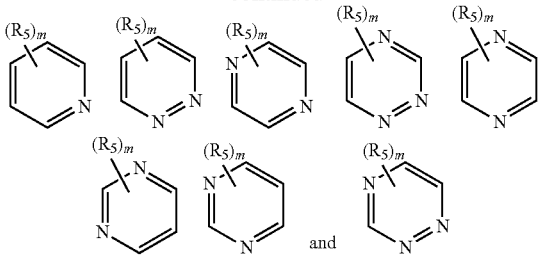

wherein, m is 0, 1, 2, 3, or 4, in some embodiments m is 0, 1, or 2, in some embodiments m is 0 or 1, and in some embodiments, m is 0; and $R_5$ is halo, haloalkyl, alkyl, alkenyl, aryl, heteroaryl, cycloalkyl, or heterocyclyl. Ring B may be phenyl.

In certain embodiments, the oligomer is a di-functional compound in that Ring B is directly bonded to only two (2) amide groups (e.g., C(O)HN or NHC(O)). In such embodiments, m in Formula (I) may be 0. Of course, in certain embodiments, Ring B may also be directly bonded to three (3) or more amide groups. For example, one embodiment of such a compound is provided by general formula (II):

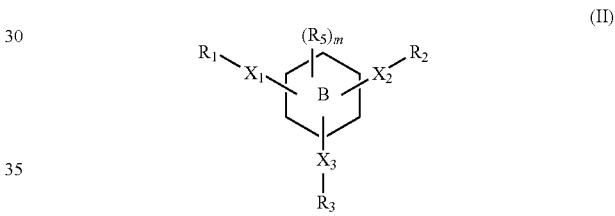

(II)

wherein, ring B, $R_5$, $X_1$, $X_2$, $R_1$, and $R_2$ are as defined above;

m is from 0 to 3;

$X_3$ is C(O)HN or NHC(O); and $R_3$ is selected from aryl, heteroaryl, cycloalkyl, and heterocyclyl.

Another embodiment of such a compound is provided by general formula (III):

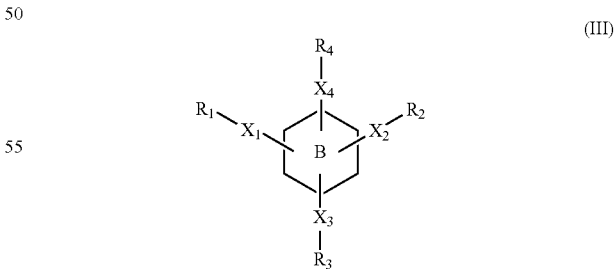

(III)

wherein, ring B, $R_5$, $X_1$, $X_2$, $X_3$, $R_1$, $R_2$, and $R_3$ are as defined above;

$X_4$ is C(O)HN or NHC(O); and $R_4$ is selected from aryl, heteroaryl, cycloalkyl, and heterocyclyl, In some embodiments, $R_1$, $R_2$, $R_3$, and/or $R_4$ in the structures noted above may be selected from the following:

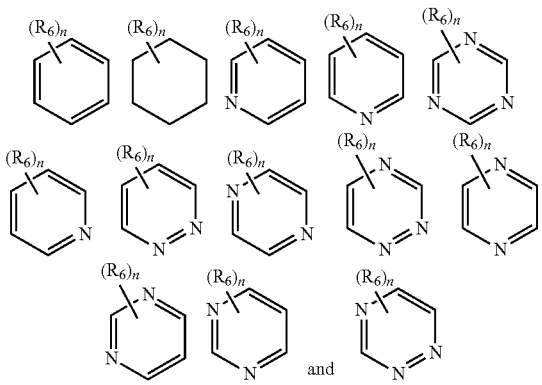

wherein, n is 0, 1, 2, 3, 4, or 5, in some embodiments n is 0, 1, or 2, and in some embodiments, n is 0 or 1; and $R_6$ is halo, haloalkyl, alkyl, alkenyl, aryl, heteroaryl, cycloalkyl, or heterocyclyl.

In one embodiment, the aromatic amide oligomer has the following general formula (IV):

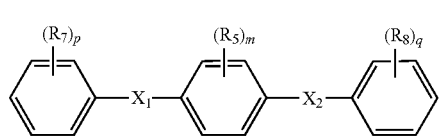

wherein, $X_1$ and $X_2$ are independently C(O)HN or NHC(O);

$R_5$, $R_7$, and $R_8$ are independently selected from halo, haloalkyl, alkyl, alkenyl, aryl, heteroaryl, cycloalkyl, and heterocyclyl;

m is from 0 to 4; and p and q are independently from 0 to 5.

In another embodiment, the aromatic amide oligomer has the following general formula (V):

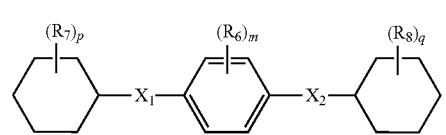

wherein, $X_1$, $X_2$, $R_5$, $R_7$, $R_8$, m, p, and q are as defined above.

For example, in certain embodiments, m, p, and q in Formula (IV) and Formula (V) may be equal to 0 so that the core and terminal groups are unsubstituted. In other embodiments, m may be 0 and p and q may be from 1 to 5. In such embodiments, for example, $R_7$ and/or $R_8$ may be halo (e.g., fluorine). In other embodiments, $R_7$ and/or $R_8$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, aryl, heteroaryl, cycloalkyl, and heterocyclyl. In one particular embodiment, for example, $R_7$ and/or $R_8$ are phenyl substituted with —C(O)HN— or —NHC(O)—. In yet other embodiments, $R_7$ and/or $R_8$ may be heteroaryl (e.g., pyridinyl).

In yet another embodiment, the aromatic amide oligomer has the following general formula (VI):

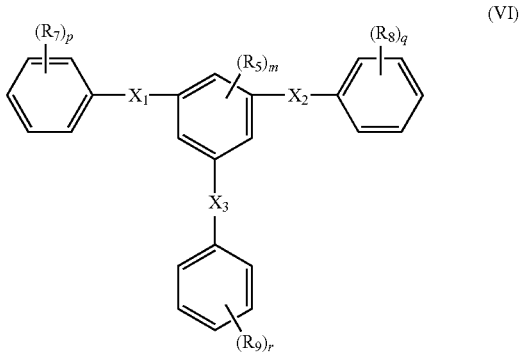

wherein, $X_1$, $X_2$, and $X_3$ are independently C(O)HN or NHC(O);

$R_5$, $R_7$, $R_8$, and $R_9$ are independently selected from halo, haloalkyl, alkyl, alkenyl, aryl, heteroaryl, cycloalkyl, and heterocyclyl;

m is from 0 to 3; and p, q, and r are independently from 0 to 5.

In yet another embodiment, the aromatic amide oligomer has the following general formula (VII):

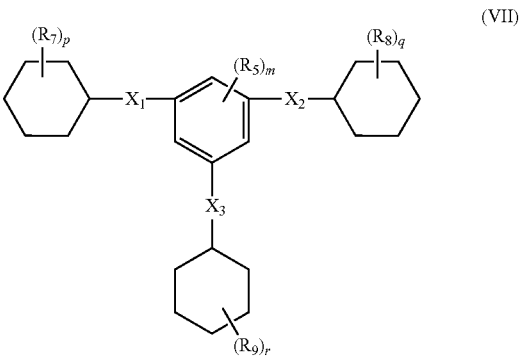

wherein, $X_1$, $X_2$, $X_3$, $R_5$, $R_7$, $R_8$, $R_9$, m, p, q, and r are as defined above.

For example, in certain embodiments, m, p, q, and r in Formula (VI) or in Formula (VII) may be equal to 0 so that the core and terminal aromatic groups are unsubstituted. In other embodiments, m may be 0 and p, q, and r may be from 1 to 5. In such embodiments, for example, $R_7$, $R_8$, and/or $R_9$ may be halo (e.g., fluorine). In other embodiments, $R_7$, $R_8$, and/or $R_9$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, aryl, heteroaryl, cycloalkyl, and heterocyclyl. In one particular embodiment, for example, $R_7$, $R_8$, and/or $R_9$ are phenyl substituted with —C(O)HN— or —NHC(O)—. In yet other embodiments, $R_7$, $R_8$, and/or $R_9$ may be heteroaryl (e.g., pyridinyl).

Specific embodiments of the aromatic amide oligomer of the present invention are also set forth in the table below:

| Cmpd # | Structure | Name | MW (g/mol) |
|---|---|---|---|
| A | | N1,N4-bis(4-benzamidophenyl) terephthalamide | 554.6 |
| B | | N4-phenyl-N1-[4-[[4-(phenylcarbamoyl) benzoyl]amino]phenyl] terephthalamide | 554.6 |
| C1 | | N4-phenyl-N1-[3-[[4-(phenylcarbamoyl) benzoyl]amino]phenyl] terephthalamide | 554.6 |
| C2 | | N1,N3-bis(4-benzamidophenyl) benzene-1,3-dicarboxamide | 554.6 |

-continued

| Cmpd # | Structure | Name | MW (g/mol) |
|---|---|---|---|
| D1 | | N3-phenyl-N1-[3-[[3-(phenylcarbamoyl)benzoyl]amino]phenyl]benzene-1,3-dicarboxamide | 554.6 |
| D2 | | N1,N3-bis(3-benzamidophenyl)benzene-1,3-dicarboxamide | 554.6 |
| E | | N1,N3-bis(4-phenylphenyl)benzene-1,3-dicarboxamide | 468.5 |
| F | | N1,N3,N5-triphenyl-benzene-1,3,5-tricarboxamide | 435.5 |

-continued

| Cmpd # | Structure | Name | MW (g/mol) |
|---|---|---|---|
| G | | N-(4,6-dibenzamido-1,3,5-triazin-2-yl)benzamide | 438.4 |
| H | | N1,N3,N5-tris(4-benzamidophenyl)benzene-1,3,5-tricarboxamide | 792.8 |
| I | | N1,N3,N5-tris(3-benzamidophenyl)benzene-1,3,5-tricarboxamide | 792.8 |

The aromatic amide oligomer of the present invention is typically added to the polymerization apparatus employed during melt polymerization. Although it may be introduced at any time, it is normally desired to apply the oligomer before melt polymerization has been initiated, and typically in conjunction with the precursor monomers for the liquid crystalline polymer. The relative amount of the aromatic amide oligomer added to the reaction mixture may be selected to help achieve a balance between viscosity and mechanical properties. In most embodiments, for example, the aromatic amide oligomer is employed in an amount of from about 0.1 to about 10 parts, in some embodiments from about 0.1 to about 5 parts, in some embodiments from about 0.2 to about 4 parts, and in some embodiments, from about 0.3 to about 1.5 parts by weight relative to 100 parts by weight of the reaction mixture. The aromatic amide oligomers may, for example, constitute from about 0.1 wt. % to about 5 wt. %, in some embodiments from about 0.2 wt. % to about 4 wt. %, and in some embodiments, from about 0.3 wt. % to about 1.5 wt. % of the reaction mixture. Liquid crystalline polymers may likewise constitute from about 95 wt. % to about 99.9 wt. %, in some embodiments from about 96 wt. % to about 98.8 wt. %, and in some embodiments, from about 98.5 wt. % to about 99.7 wt. % of the reaction mixture. While referred to in terms of the reaction mixture, it should also be understood that the ratios and weight percentages may also be applicable to the final polymer composition. That is, the parts by weight of the oligomer relative to 100 parts by weight of liquid crystalline polymer and the percentage of the oligomer in the final polymer composition may be within the ranges noted above.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming an aromatic polyester may include charging precursor monomers (e.g., 4-hydroxybenzoic acid and 2,6-hydroxynaphthoic acid), aromatic amide oligomer, and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. After melt polymerization, the resulting prepolymer may then be subjected to a solid-state polymerization process as described above.

Regardless of the particular manner in which it is formed, the resulting liquid crystalline polymer will generally have a high number average molecular weight ($M_n$), such as about 2,000 grams per mole or more, in some embodiments from about 4,000 grams per mole or more, and in some embodiments, from about 5,000 to about 30,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol, as described in more detail below.

The melting temperature of the polymer may also range from about 250° C. to about 400° C., in some embodiments from about 270° C. to about 380° C., and in some embodiments, from about 300° C. to about 360° C. Likewise, the crystallization temperature may range from about 200° C. to about 400° C., in some embodiments from about 250° C. to about 350° C., and in some embodiments, from about 280° C. to about 320° C. The melting and crystallization temperatures may be determined as is well known in the art using differential scanning calorimetry ("DSC"), such as determined by ISO Test No. 11357. In certain embodiments, the oligomeric flow aid may also accelerate the extent to which the "high shear" melt viscosity is increased (e.g., during solid-state polymerization), which can correlate to the rate at which chain extension occurs. This increased rate of chain extension may also contribute to a substantial reduction in the polymerization time needed to achieve a certain molecular weight. In this regard, the resulting polymer may have a melt viscosity (at a temperature of 375° C. and shear rate of 1000 seconds$^{-1}$) of from about 100 to about 2,000 Pa-s, in some embodiments from about 150 to about 1,500 Pa-s, and in some embodiments, from about 200 to about 900 Pa-s. When such a polymer is formed via solid-state polymerization as described above, the melt viscosity may be substantially greater than the melt viscosity obtained during melt polymerization. For instance, the ratio of the "high shear" melt viscosity of the solid-state polymerized polymer to the "high shear" melt viscosity of the melt-polymerized prepolymer is typically from about 3 to about 20, in some embodiments from about 4 to about 15, and in some embodiments, from about 5 to about 10, and the melt-polymerized prepolymer may have a melt viscosity (at a temperature of 375° C. and shear rate of 1000 seconds$^{-1}$) of from about 10 to about 250 Pa-s, in some embodiments from about 15 to about 200 Pa-s, and in some embodiments, from about 20 to about 150 Pa-s.

C. Other Additives

In addition to the components identified above, various other additives may also be incorporated in the polymer composition if desired. For example, a filler material may be incorporated into the polymer composition to enhance strength. Mineral fillers may, for instance, be employed in the polymer composition to help achieve the desired mechanical properties and/or appearance. Such fillers are particularly desirable when forming thermoformed articles. When employed, mineral fillers typically constitute from about 5 wt. % to about 60 wt. %, in some embodiments from about 10 wt. % to about 55 wt. %, and in some embodiments, from about 20 wt. % to about 50 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($(MgFe,Al)_3(Al,Si_4O_{10}(OH)_2 \cdot 4H_2O$), palygorskite (($Mg,Al)_2Si_4O_{10}(OH) \cdot 4(H_2O)$)), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Fibers may also be employed as a filler material to further improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevfar® marketed by E.I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The volume average length of the fibers may be from about 50 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 50 to about 400 micrometers, in some embodiments from about 80 to about 250 micrometers, in some embodiments from about 100 to about 200 micrometers, and in some embodiments, from about 110 to about 180 micrometers. The fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The relative amount of the fibers in the polymer composition may also be selectively controlled to help achieve the desired mechanical properties without adversely impacting other properties of the composition, such as its flowability. For example, the fibers may constitute from about 2 wt. % to about 40 wt. %, in some embodiments from about 5 wt. % to about 35 wt. %, and in some embodiments, from about 6 wt. % to about 30 wt % of the polymer composition. Although the fibers may be employed within the ranges noted above, small fiber contents may be employed while still achieving the desired mechanical properties. For example, the fibers can be employed in small amounts such as from about 2 wt. % to about 20 wt. %, in some embodiments, from about 5 wt. % to about 16 wt. %, and in some embodiments, from about 6 wt. % to about 12 wt. %.

Still other additives that can be included in the composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

Regardless of the particular additives employed, the resulting polymer composition generally possesses properties that facilitate its use in forming thin, melt-extruded substrates for use in thermoformed articles. For example, the melting temperature of the polymer composition may be substantially same as the polymer itself, and within a range of from about 250° C. to about 400° C., in some embodiments from about 270° C. to about 380° C., and in some embodiments, from about 300° C. to about 360° C. The crystallization temperature may likewise range from about 200° C. to about 400° C., in some embodiments from about 250° C. to about 350° C., and in some embodiments, from about 280° C. to about 320° C.

The polymer composition may also have a solidification rate and/or crystallization rate that allows for extruding without producing tears, ruptures, stress fractures, blisters, etc. In this regard, the polymer composition may have a relatively high heat of crystallization, such as about 3.3 J/g or more, in some embodiments about 3.5 J/g or more, in some embodiments from about 3.5 to about 10 J/g, and in some embodiments, from about 3.7 to about 6.0 J/g. As used herein, the heat of crystallization is determined according to ISO Test No. 11357. The polymer composition may have a melt viscosity (at a temperature of 375° C. and shear rate of 1000 seconds$^{-1}$) of from about 10 to about 300 Pa-s, in some embodiments from about 25 to about 250 Pa-s, and in some embodiments, from about 50 to about 200 Pa-s.

II. Melt Extrusion

Figure 9:
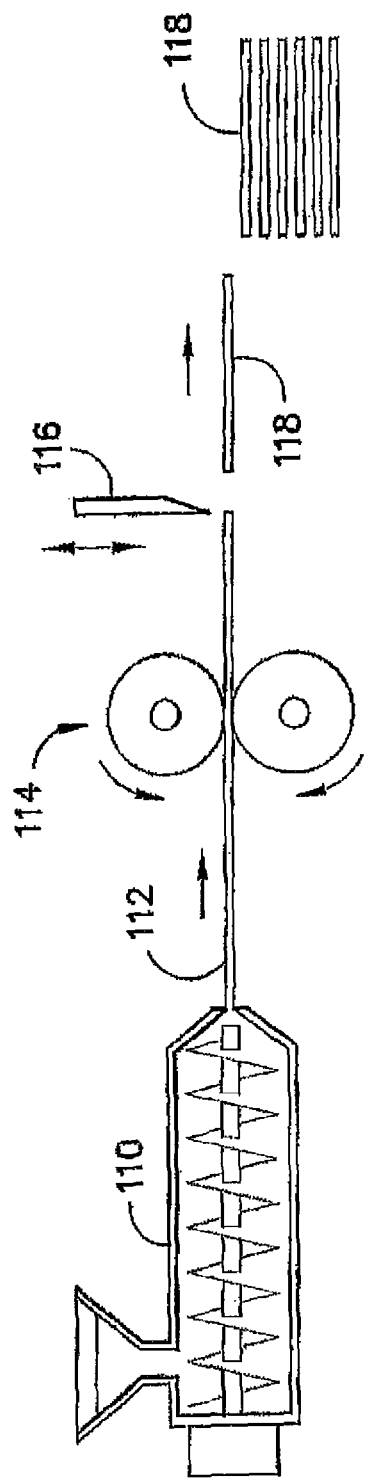
FIG. 9 is a side view of a process for forming extruded polymeric sheets in accordance with one embodiment of the present invention.

Any of a variety of melt extrusion techniques may generally be employed to form the thin substrate of the present invention. Suitable melt extrusion techniques may include, for instance, tubular trapped bubble film processes, flat or tube cast film processes, slit die flat cast film processes, etc. Referring to FIG. 9, for instance, one embodiment of a melt extrusion process is shown in more detail. As illustrated, the components of the polymer composition (e.g., polymer and any optional additives) may be initially fed to an extruder 110 that heats the composition to a temperature sufficient for it to flow. In one embodiment, the polymer composition is heated to a temperature that is at the melting temperature of the polymer composition or within a range of about 20° C. above or below the melting temperature of the polymer composition. The extruder 110 produces a precursor sheet 112. Before having a chance to solidify, the precursor sheet 112 may be fed into a nip of a calendering device 114 to form a polymeric sheet have a more uniform thickness. The calendering device 114 may include, for instance, a pair of calendering rolls that form the nip. Once calendered, the resulting polymeric sheet may optionally be cut into individual sheets 118 using a cutting device 116. The sheets formed according to the process described above generally have a relatively large surface area in comparison to their thickness. As described above, for instance, the thickness of the sheets may be about 20 millimeters or less, in some embodiments from about 0.05 to about 15 millimeters, and in some embodiments, from about 0.1 to about 10 millimeters. The surface area of one side of the polymeric sheets may likewise be greater than about 900 cm$^2$, such as greater than about 2000 cm$^2$, such as greater than about 4000 cm$^2$. In one embodiment, for instance, the surface area of one side of the polymeric sheet may be from about 1000 cm$^2$ to about 6000 cm$^2$.

The tensile and flexural mechanical properties of the substrate are also good. For example, the substrate may exhibit a flexural strength of from about 20 to about 500 MPa, in some embodiments from about 40 to about 200 MPa, and in some embodiments, from about 50 to about 150 MPa; a flexural break strain of about 0.5% or more, in some embodiments from about 0.6% to about 10%, and in some embodiments, from about 0.8% to about 3.5%; and/or a flexural modulus of from about 2,000 MPa to about 20,000 MPa, in some embodiments from about 3,000 MPa to about 20,000 MPa, and in some embodiments, from about 4,000 MPa to about 15,000 MPa. The flexural properties may be determined in accordance with ISO Test No. 178 (technically equivalent to ASTM D790-98) at 23° C. The tensile strength may also be from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 5,000 MPa to about 20,000 MPa, in some embodiments from about 8,000 MPa to about 20,000 MPa, and in some embodiments, from about 10,000 MPa to about 15,000 MPa. The tensile properties may be determined in accordance with ISO Test No. 527 (technically equivalent to ASTM D638) at 23° C.

III. Thermoformed Articles

Regardless of the manner in which it is formed, the extruded substrate may be thermoformed by heating it to a certain temperature so that it becomes flowable, shaping the substrate within a mold, and then optionally trimming the shaped article to create the desired article. For example, a sheet may be clamped inside a thermoformer and heated (e.g., with infrared heaters) to a temperature of slightly above 350° C. Depending on the type of machine used, the sheet may be transferred to a forming station or the bottom heating elements may be moved for the forming tool to be able to form the sheet. The forming tool (e.g., aluminum) may be heated to about 120° C. to about 200° C. Different thermoforming techniques can be successfully used, such as vacuum forming, plug-assist vacuum forming, pressure forming, reverse draw, twin sheet thermoforming and others. Once the forming step is completed, the part can be trimmed.

Figure 10:
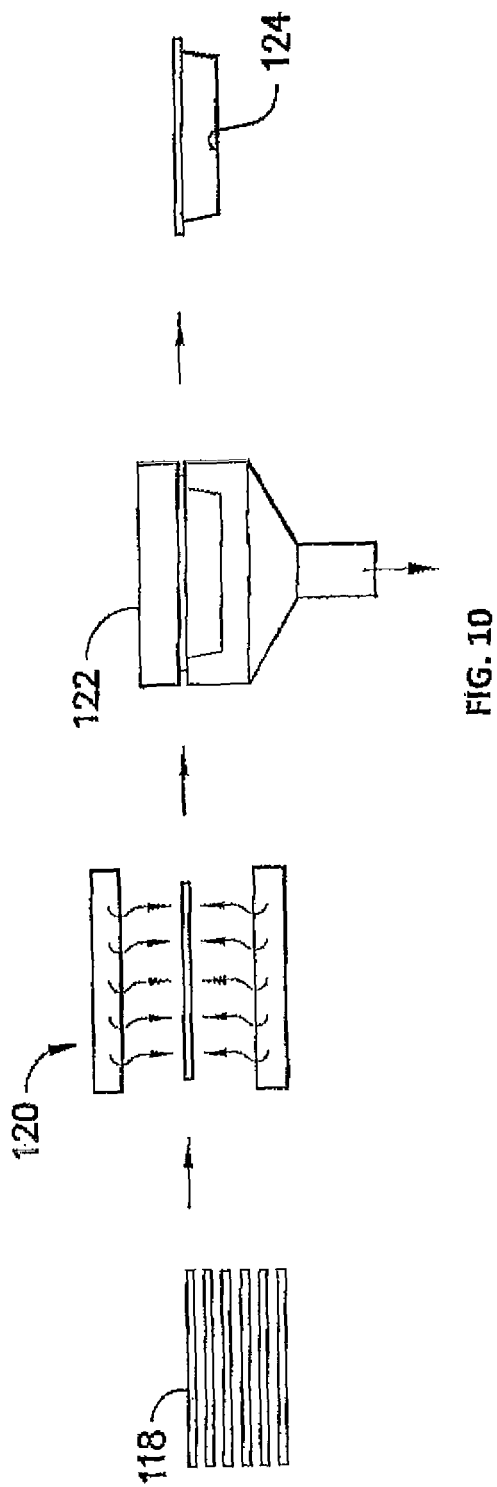
FIG. 10 is a side view of a thermoforming process that may be employed in one embodiment of the present invention.

Referring to FIG. 10, for example, one particular embodiment of a thermoforming process is shown in more detail. As illustrated, the polymeric sheet 118 is first fed to a heating device 120 that heats it to a temperature sufficient to cause the polymer to deform or stretch. In general, any suitable heating device may be used, such as a convection oven, electrical resistance heater, infrared heater, etc. Once heated, the polymeric sheet 118 is fed to a molding device 122 where it is molded into an article. Any of a variety of molding devices may be employed in the thermoforming process, such as a vacuum mold. Regardless, a force (e.g., suction force) is typically placed against the sheet to cause it to conform to the contours of the mold. At the contours, for instance, the draw ratio may be greater than 1:1 to about 5:1. Molding of the polymeric sheet 118 typically occurs before the sheet substantially solidifies and/or crystallizes. Thus, the properties of the polymer are not only important during production of the polymeric sheets 118, but are also important during the subsequent molding process. If the polymeric sheet 118 were to solidify and/or crystallize too quickly, the polymer may tear, rupture, blister or otherwise form defects in the final article during molding.

As described above, various different articles may be made in accordance with the present invention. Of particular advantage, three-dimensional articles may be made that have many beneficial properties. For example, the thermoformed article can have a deflection temperature under load (DTUL) of at least about 230° C., such as from about 230° C. to about 300° C. Heat deflection temperature is defined as the temperature at which a standard test bar deflects a specified distance under a load. It is typically used to determine short term heat resistance. As used herein, DTUL is determined according to ISO Test No. 75. More particularly, the melt-extruded substrate and/or polymer composition used to form the substrate may have a DTUL at 1.8 MPa of greater than about 255° C., such as greater than about 265° C. For instance, the DTUL can be from about 245° C. to about 300° C.

The resulting article may, for example, be a package, container, tray (e.g., for a food article), electrical connector, bottle, pouch, cup, tub, pail, jar, box, engine cover, aircraft part, circuit board, etc. Although any suitable three-dimensional article can be formed, the melt-extruded substrate of the present invention is particularly well suited to producing cooking articles, such as cookware and bakeware. For example, when formed in accordance with the present invention, such articles can be capable of withstanding very high temperatures, including any oven environment for food processing. The articles are also chemical resistant and exceptionally inert. The articles, for instance, may be being exposed to any one of numerous chemicals used to prepare foods and for cleaning without degrading while remaining resistant to stress cracking. In addition, the articles may also possess excellent anti-stick or release properties. Thus, when molded into a cooking article, no separate coatings may be needed to prevent the article from sticking to food items. In this manner, many bakery goods can be prepared in cookware or bakeware without having to grease the pans before baking, thus affording a more sanitary working environment. The substrate also greatly reduces or eliminates a common issue of trapped food or grease in corners of rolled metal pans as solid radius corners can be easily incorporated into cookware.

The types of cooking articles can vary dramatically depending upon the particular application. The melt-extruded substrate may, for instance, be used to produce bakeware, cookware, and any suitable parts that may be used in food processing equipment, such as cake pans, pie pans, cooking trays, bun pans, cooking pans, muffin pans, bread pans, etc. For exemplary purposes only, various different cookware articles that may be made in accordance with the present disclosure are illustrated in FIGS. 6-8. Referring to FIGS. 6-7, for instance, one embodiment of a cooking pan or tray 10 is shown that includes a bottom surface 12 that is surrounded by a plurality of walls 14, 16, 18 and 20. The bottom surface 12 is configured to receive a food item for preparation and/or serving. The side wall 16 forms a contour that transitions into the bottom surface 12. In the illustrated embodiment, the tray 10 is also surrounded by a lip or flange 22. The flange 22 may have any desired shape and/or length that assists in holding the tray during food preparation and/or when the tray is hot. An alternative embodiment of a cookware article is also shown in FIG. 8 that contains a muffin pan 50. The muffin pan 50 contains a plurality of cavities 52 for baking various food articles, such as muffins or cupcakes. As shown, each cavity 52 includes a bottom surface 54 surrounded by a circular wall 56. The muffin pan 50 can have overall dimensions similar to the cooking tray 10.

The present invention may be better understood with reference to the following examples.

Test Methods

Melt Elongation:

Melt elongation properties may be determined in accordance with the ARES-EVF: Option for Measuring Extensional Velocity of Polymer Melts, A. Franck, which is incorporated herein by reference. In this test, an extensional viscosity fixture ("EVF") is used on a rotational rheometer to allow the measurement of the engineering stress at a certain percent strain. More particularly, a thin rectangular polymer melt sample is adhered to two parallel cylinders: one cylinder rotates to wind up the polymer melt and lead to continuous uniaxial deformation in the sample, and the other cylinder measures the stress from the sample. An exponential increase in the sample length occurs with a rotating cylinder. Therefore, the Hencky strain ($\epsilon_H$) is determined as function of time by the following equation: $\epsilon_H(t)=\ln(L(t)/L_o)$, where $L_o$ is the initial gauge length of and $L(t)$ is the gauge length as a function of time. The percent strain is likewise determined by multiplying the Hencky strain by 100. The test may be conducted at a temperature of 300° C. and elongation rate of 5 s$^{-1}$.

Melt Viscosity:

The melt viscosity (Pa-s) may be determined in accordance with ISO Test No. 11443 at 375° C. and at a shear rate of 400 s$^{-1}$ and 1000 s$^{-1}$ using a Dynisco 7001 capillary rheometer. The rheometer orifice (die) may have a diameter of 1 mm, length of 20 mm, L/D ratio of 20.1, and an entrance angle of 180°. The diameter of the barrel may be 9.55 mm±0.005 mm and the length of the rod may be 233.4 mm.

Complex Viscosity:

The complex viscosity is used herein as an estimate for the "low shear" viscosity of the polymer composition at low frequencies. Complex viscosity is a frequency-dependent viscosity, determined during forced harmonic oscillation of shear stress at angular frequencies of 0.15 and 500 radians per second. Measurements may be determined at a constant temperature of 375° C. and at a constant strain amplitude of 1% using an ARES-G2 rheometer (TA Instruments) with a parallel plate configuration (25 mm plate diameter).

Intrinsic Viscosity:

The intrinsic viscosity ("IV") may be measured in accordance with ISO-1628-5 using a 50/50 (v/v) mixture of pentafluorophenol and hexafluoroisopropanol. Each sample may be prepared in duplicate by weighing about 0.02 grams into a 22 mL vial. 10 mL of pentafluorophenol ("PFP") may be added to each vial and the solvent. The vials may be placed in a heating block set to 80° C. overnight. The following day 10 mL of hexafluoroisopropanol ("HFIP") may be added to each vial. The final polymer concentration of each sample may be about 0.1%. The samples may be allowed to cool to room temperature and analyzed using a PolyVisc automatic viscometer.

Melting and Crystallization Temperatures:

The melting temperature ("Tm") and crystallization temperature ("Tc") may be determined by differential scanning calorimetry ("DSC") as is known in the art. The melting temperature may be the differential scanning calorimetry (DSC) peak melt temperature as determined by ISO Test No. 11357. The crystallization temperature may be determined from the cooling exotherm in the cooling cycle. Under the DSC procedure, samples may be heated and cooled at 20° C. per minute as stated in ISO Standard 10350 using DSC measurements conducted on a TA Q2000 Instrument.

Flexural Modulus, Flexural Stress, and Flexural Strain:

Flexural properties may be determined according to ISO Test No. 178 (technically equivalent to ASTM D790-98). This test may be performed on a 64 mm support span. Tests may be run on the center portions of uncut ISO 3167 multi-purpose bars. The testing temperature may be 23° C. and the testing speed may be 2 mm/min.

Synthesis of N4-phenyl-N1-[4-[[4-(phenylcarbamoyl)benzoyl]amino]phenyl]terephthalamide Compound A The synthesis of Compound A from 4-amino benzanilide and terephthaloyl chloride, can be performed according to the following scheme:

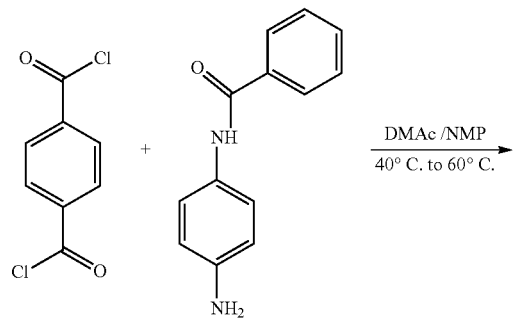

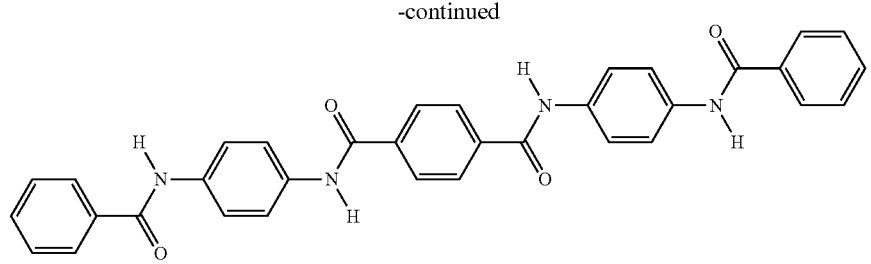

The experimental setup consisted of a 1 L glass beaker equipped with a glass rod stirrer coupled with an overhead mechanical stirrer. 4-aminobenzanilide (20.9 g) was dissolved in warm DMAc (250 mL) (alternatively N-methylpyrrolidone can also be used). Terephthaloyl chloride (10 g) was added to the stirred solution of the diamine maintained at 40-50° C., upon the addition of the acid chloride the reaction temperature increased from 50° C. to 80° C. After the addition of the acid chloride was completed, the reaction mixture was warmed to 70-80° C. and maintained at that temperature for about three hours and allowed to rest overnight at room temperature. The article was then isolated by the addition of water (500 mL) followed by vacuum filtration followed by washing with hot water (1 L). The article was then dried in a vacuum oven at 150° C. for about 6-8 hours, to give a pale yellow colored solid (yield ca. 90%). The melting temperature by DSC was 462° C.

Synthesis of N1,N3-bis(4-benzamidophenyl)benzene-1,3-dicarboxamide

Compound C2

The synthesis of Compound C2 from 1,4-phenylene diamine, terephthaloyl chloride, and benzoyl chloride may be performed according to the following scheme:

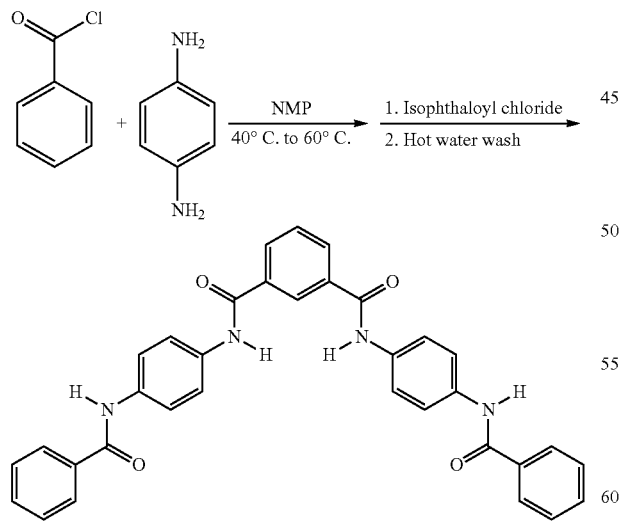

The experimental setup consisted of a 500 mL glass beaker equipped with a magnetic stirrer. 1,4 phenylene diamine (20 g) was dissolved in warm NMP (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and then allowed to cool to 50° C. After cooling to the desired temperature, isophthaloyl chloride (18.39 g) was added in small portions such that the temperature of the reaction mixture did not increase above 70° C. The mixture was then stirred for additional one (1) hour at 70° C., and was allowed to rest overnight at room temperature. The article was recovered by addition of water (200 mL) to the reaction mixture, followed by filtration and washing with hot water (500 mL). The article was then dried in a vacuum oven at 150° C. for about 6-8 hours to give a pale yellow colored solid (yield ca. 90%). The melting temperature by DSC was 329° C. The Proton NMR characterization for the compound is also shown in FIG. 1.

Synthesis of N1,N3-bis(3-benzamidophenyl)benzene-1,3-dicarboxamide

Compound D2

The synthesis of Compound D2 from 1,3-phenylene diamine, isophthaloyl chloride, and benzoyl chloride may be performed according to the following scheme:

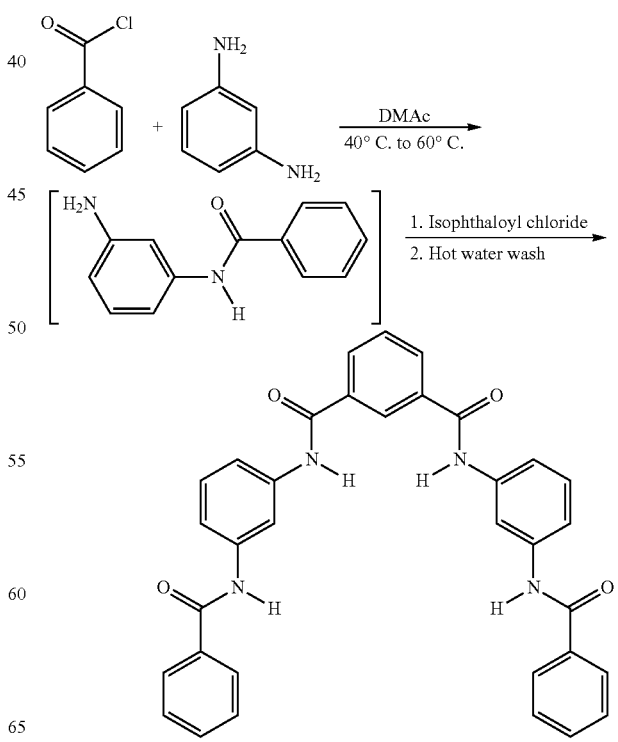

Figure 2:
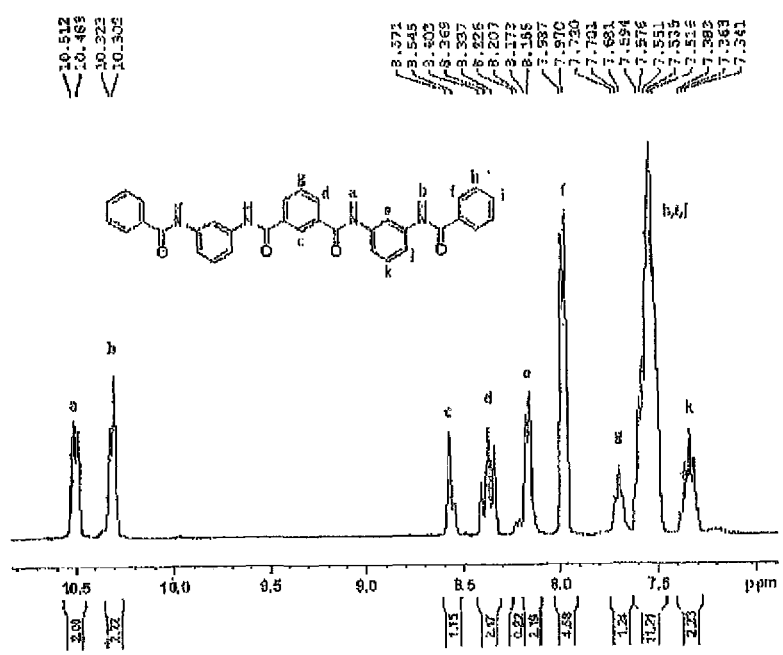
FIG. 2 is the Proton NMR characterization for N1,N3-bis (3-benzamidophenyl)benzene-1,3-dicarboxamide (Compound D2)

The experimental setup consisted of a 500 mL glass beaker equipped with a magnetic stirrer. 1,3 phenylene diamine (20 g) was dissolved in warm DMAc (200 mL) at 40° C. Benzoyl chloride (26.51 g) was added drop wise to a stirred solution of the diamine over a period of 30 minutes. After the addition of the benzoyl chloride was completed, the reaction mixture was warmed to 70-80° C. and allowed to cool to 50° C. After cooling to the desired temperature, isophthaloyl chloride (18.39 g) was added in small portions such that the temperature of the reaction mixture did not increase above 70° C. The mixture was then stirred for additional one hour at 70° C., and was allowed to rest overnight at room temperature. The article was recovered by addition of water (200 mL) to the reaction mixture, followed by filtration and washing with hot water (500 mL). The article was then dried in a vacuum oven at 150° C. for about 6-8 hours to give a pale yellow colored solid (yield ca. 90%). The Proton NMR characterization for the compound is also shown in FIG. 2.

Synthesis of
N1,N3,N5-triphenylbenzene-1,3,5-tricarboxamide

Compound F

Compound F may be synthesized from trimesoyl chloride and aniline according to the following scheme:

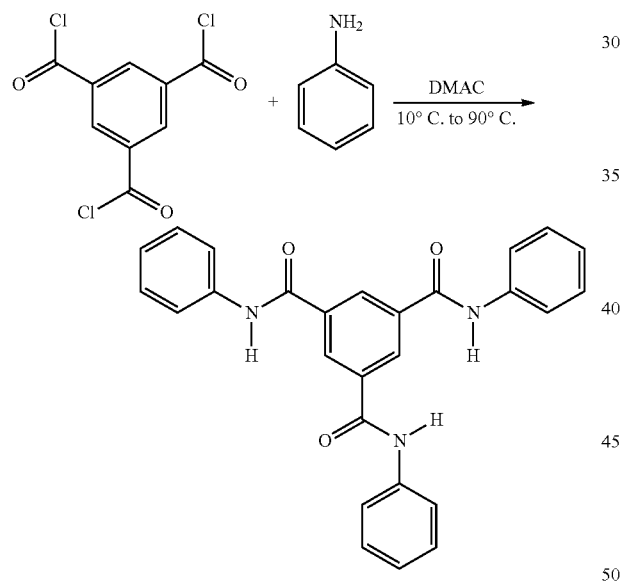

Figure 3:
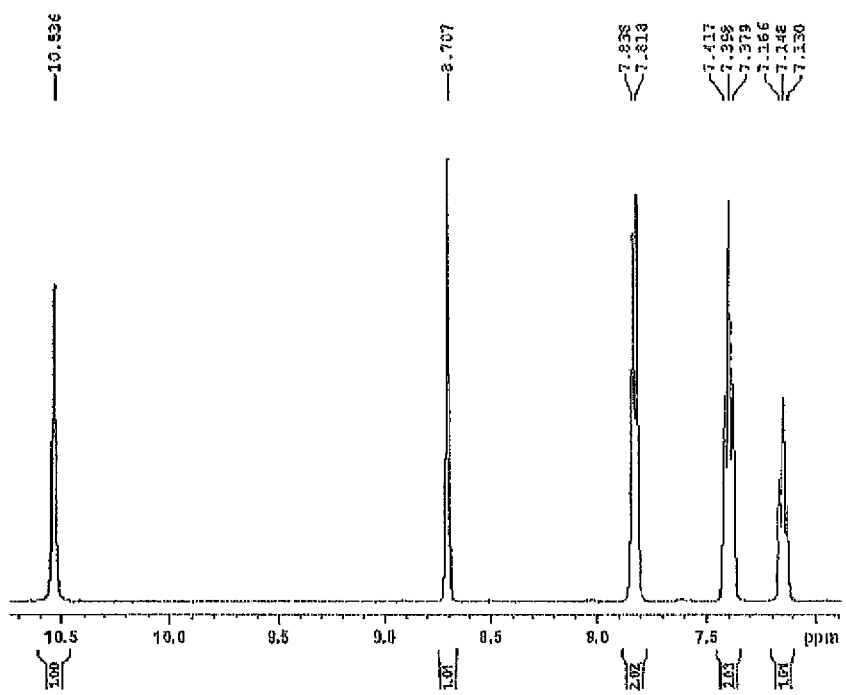
FIG. 3 is the Proton NMR characterization for N1,N3,N5-triphenylbenzene-1,3,5-tricarboxamide (Compound F)

The experimental set up consisted of a 2 L glass beaker equipped with a glass rod stirrer coupled with an overhead mechanical stirrer. Trimesoyl chloride (200 g) was dissolved in dimethyl acetamide ("DMAc") (1 L) and cooled by an ice bath to 10-20° C. Aniline (421 g) was added drop wise to a stirred solution of the acid chloride over a period of 1.5 to 2 hours. After the addition of the amine was completed, the reaction mixture was stirred additionally for 45 minutes, after which the temperature was increased to 90° C. for about 1 hour. The mixture was allowed to rest overnight at room temperature. The article was recovered by precipitation through the addition of 1.5 L of distilled water, which was followed by was vacuum filtration using a filter paper and a Buchner funnel. The crude article was washed with acetone (2 L) and then washed again with hot water (2 L). The article was then air dried over night at room temperature and then was dried in a vacuum oven 150° C. for 4 to 6 hours. The article (250 g) was a white solid, and had a melting temperature of 319.6° C., as determined by differential scanning calorimetry ("DSC"). The Proton NMR characterization for the compound is shown in FIG. 3.

Synthesis of N1,N3,N5-tris(4-benzamidophenyl)
benzene-1,3,5-tricarboxamide

Compound H

The synthesis of Compound H from trimesoyl chloride and 4-benzoanilide may be performed according to the following scheme:

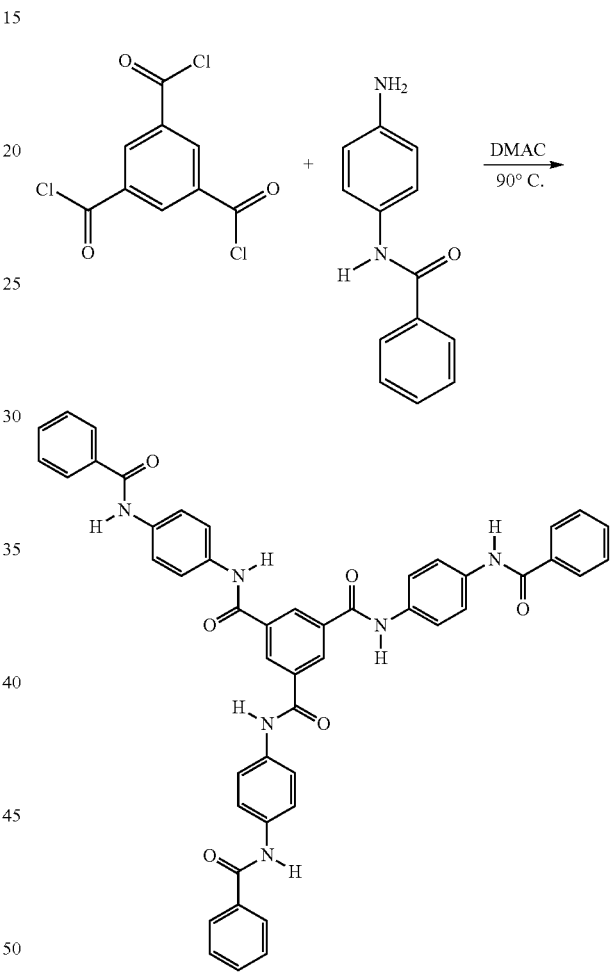

Figure 4:
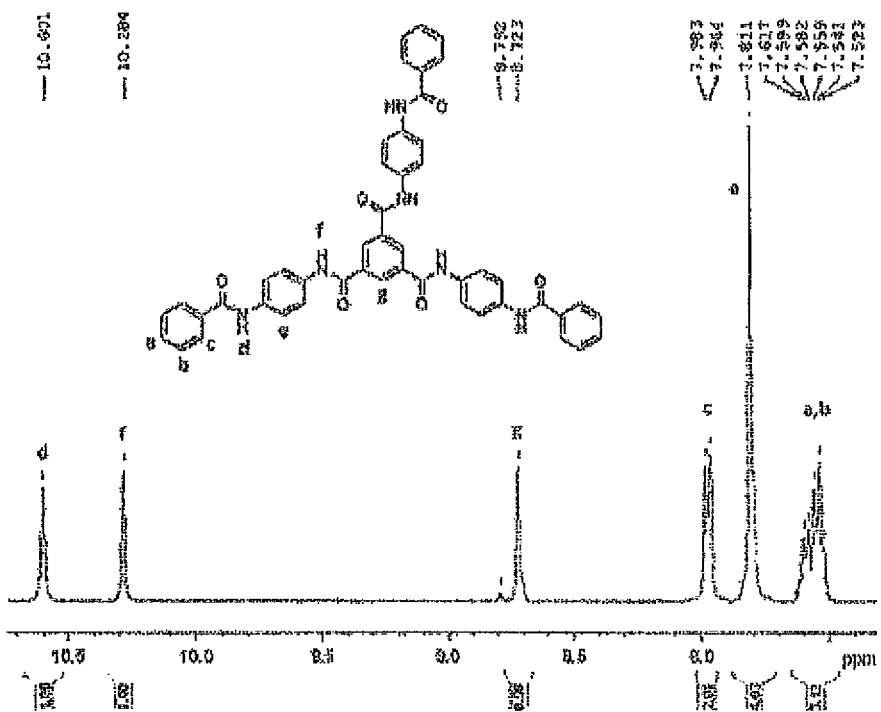
FIG. 4 is the Proton NMR characterization for N1,N3,N5-tris(4-benzamidophenyl)benzene-1,3,5-tricarboxamide (Compound H)

The experimental setup consisted of a 2 L glass beaker equipped with a glass rod stirrer coupled with an overhead mechanical stirrer. Trimesoyl chloride (27.8 g) was dissolved in DMAc (100 mL) at room temperature. 4-aminobenzanilide (69.3 g) was dissolved in DMAc (250 mL). The amine solution was gradually added to the acid chloride solution over a period of fifteen minutes, the reaction mixture was then stirred and the temperature was increased to 90° C. for about three hours. The mixture was allowed to rest overnight at room temperature. The article was recovered by precipitation by addition of 1.5 L of distilled water and followed by was vacuum filtration using a filter paper and a Buchner funnel. The crude article was then washed with acetone (500 mL) and then washed again with hot water (1 L). The article was then air dried over night at room temperature and then was dried in a vacuum oven 150° C. for 4-6 hours. The article (yield-80-85%) was a bright yellow solid. The Proton NMR characterization for the compound is shown in FIG. 4.

Synthesis of N1,N3,N5-tris(3-benzamidophenyl)benzene-1,3,5-tricarboxamide

Compound I

The synthesis of Compound I from trimesoyl chloride, benzoyl chloride and 1,3-phenylene diamine can be performed according to the following scheme:

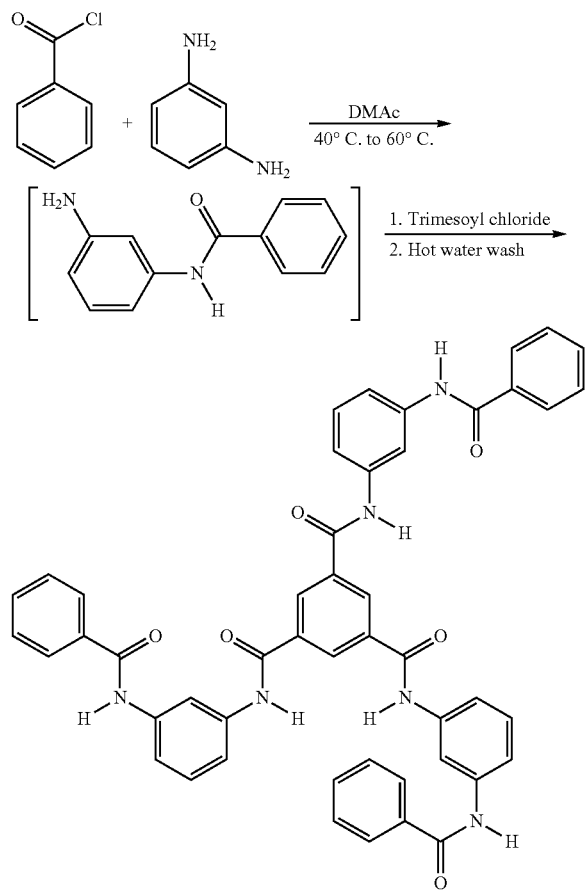

The experimental set up consisted of a 1 L glass beaker equipped with a glass rod stirrer coupled with an overhead mechanical stirrer. 1,3 phenylene diamine (20 g) was dissolved in warm dimethyl acetamide (200 mL) (alternatively N-methylpyrrolidone can also be used) and maintained at 45° C. Next benzoyl chloride (26.51 g) was slowly added drop wise over a period of 1.5 to 2 hours, to the amine solution with constant stirring. The rate of addition of the benzoyl chloride was maintained such that the reaction temperature was maintained less than 60° C. After complete addition of the benzoyl chloride, the reaction mixture was gradually warmed to 85-90° C. and then allowed to cool to around 45-50° C. At this point, trimesoyl chloride (16.03 g) was gradually added to the reaction mixture such that the exotherm did not increase the reaction temperature above 60° C. After complete addition of the trimesoyl chloride, the reaction mixture was allowed to stir for additional 45 minutes, after which the reaction temperature was increased to 90° C. for about 30 minutes and then was cooled to room temperature. The mixture was allowed to rest overnight at room temperature. The article was recovered by precipitation through the addition of 1.5 L of distilled water, which was followed by was vacuum filtration using a filter paper and a Buchner funnel. The crude article was then washed with acetone (250 mL) and washed again with hot water (500 mL). The article (yield: ca. 90%) was then air dried over night at room temperature and then was dried in a vacuum oven 150° C. for 4 to 6 hours. The article was a pale tan solid. The Proton NMR characterization was as follows: $^1$H NMR (400 MHz $d_6$-DMSO): 10.68 (s, 3H, CONH), 10.3 (s, 3H, CONH), 8.74 (s, 3H, central Ar), 8.1 (d, 3H, m-phenylene Ar), 7.9 (d, 6H, ortho-ArH), 7.51 (m, 15H, meta-para-ArH and 6H, m-phenylene Ar) and 7.36 (m, 3H, m-phenylene Ar).

EXAMPLE 1

A 2 L flask was charged with 4-hydroxybenzoic acid (415.7 g), 2,6-hydroxynaphthoic acid (32 g), terephthalic acid (151.2 g), 4,4'-biphenol (122.9 g), acetominophen (37.8 g), and 50 mg of potassium acetate. The flask was equipped with C-shaped stirrer, a thermal couple, a gas inlet, and distillation head. The flask was placed under a low nitrogen purge and acetic anhydride (99.7% assay, 497.6 g) was added. The milky-white slurry was agitated at 75 rpm and heated to 140° C. over the course of 95 minutes using a fluidized sand bath. After this time, the mixture was then gradually heated to 360° C. steadily over 300 minutes. Reflux was seen once the reaction exceeded 140° C. and the overhead temperature increased to approximately 115° C. as acetic acid byproduct was removed from the system. During the heating, the mixture grew yellow and slightly more viscous and the vapor temperature gradually dropped to 90° C. Once the mixture had reached 360° C., the nitrogen flow was stopped. The flask was evacuated below 20 psi and the agitation slowed to 30 rpm over the course of 45 minutes. As the time under vacuum progressed, the mixture grew viscous. After 72 minutes, the final viscosity target was reached as gauged by the strain on the agitator motor (torque value of 30 units). The reaction was then stopped by releasing the vacuum and stopping the heat flow to the reactor. The flask was cooled and then polymer was recovered as a solid, dense yellow-brown plug. Sample for analytical testing was obtained by mechanical size reduction.

EXAMPLE 2

A melt polymerized prepolymer was formed as described in Example 1, except that 19.65 grams of Compound A was also introduced into the reactor. It was observed that there were fewer residues in the distillate as compared to Example 1. The reaction was stopped after 72 minutes—no torque was observed on the agitator motor.

EXAMPLE 3

A melt polymerized prepolymer was formed as described in Example 1, except that 19.76 grams of Compound F was also introduced into the reactor. It was observed that there were fewer residues in the distillate as compared to Example 1. The reaction was stopped after 72 minutes—no torque was observed on the agitator motor.

EXAMPLE 4

A melt polymerized prepolymer was formed as described in Example 1, except that 18/grams of Compound H was also introduced into the reactor. It was observed that there were fewer residues in the distillate as compared to Example 1. The reaction was stopped after 72 minutes—a torque value of 50 units was observed on the agitator motor.

The thermal properties of the melt polymerized prepolymers of Examples 1-4 were tested as described above. The results are set forth below in Table 1.

TABLE 1

Properties of Melt Polymerized Prepolymers

| Example | Additive | Tm (°C.) | Tc (°C.) | IV (dL/g) | MV at 1000 s$^{-1}$ (Pa * s) | MV at 400 s$^{-1}$ (Pa * s) |
|---|---|---|---|---|---|---|
| 1 | — | 361.6 | 301.8 | 8.4 | 75.7 | 118.2 |
| 2 | A | 350.6 | 299.3 | 5.3 | 46.8 | 70.7 |
| 3 | F | 322.4 | 275.1 | 3.8 | 27.7 | 43.6 |
| 4 | H | 343.0 | 284.7 | 5.0 | 137.8 | 230.1 |

EXAMPLE 5

The melt polymerized prepolymers of Examples 1-4 were solid-state polymerized by heating the prepolymers in an air circulated oven for eight (8) hours. The oven was maintained at 280° C. The polymer flakes (80 g) were placed uniformly in a thin layer within a glass tray. The thermal and rheological properties of the "solid-state polymerized" polymers were then tested as described above. The results are set forth below in Table 2.

TABLE 2

Properties of Solid-State Polymerized Compositions

| Example | Additive | Tm (°C.) | Tc (°C.) | Intrinsic Viscosity (dL/g) | MV at 1000 s$^{-1}$ (Pa * s) | Ratio of Solid State MV to Prepolymer MV (at 1000 s$^{-1}$) | MV at 400 s$^{-1}$ (Pa * s) | Ratio of Solid State MV to Prepolymer MV (at 400 s$^{-1}$) | Complex Viscosity (Pa * s), 0.15 rad/s |
|---|---|---|---|---|---|---|---|---|---|
| 1 | — | 359.8 | 299.6 | 12.6 | 263.2 | 3.48 | 561.2 | 4.75 | 51,520 |
| 2 | A | 350.6 | 299.1 | 8.3 | 139.6 | 2.98 | 259.9 | 3.67 | 145,842 |
| 3 | F | 323.1 | 275.8 | 6.8 | 225.0 | 8.12 | 455.9 | 10.46 | 116,438 |
| 4 | H | 355.5 | 298.7 | 8.6 | 860.0 | 6.24 | 3163.8 | 13.75 | 801,447 |

Figure 5:
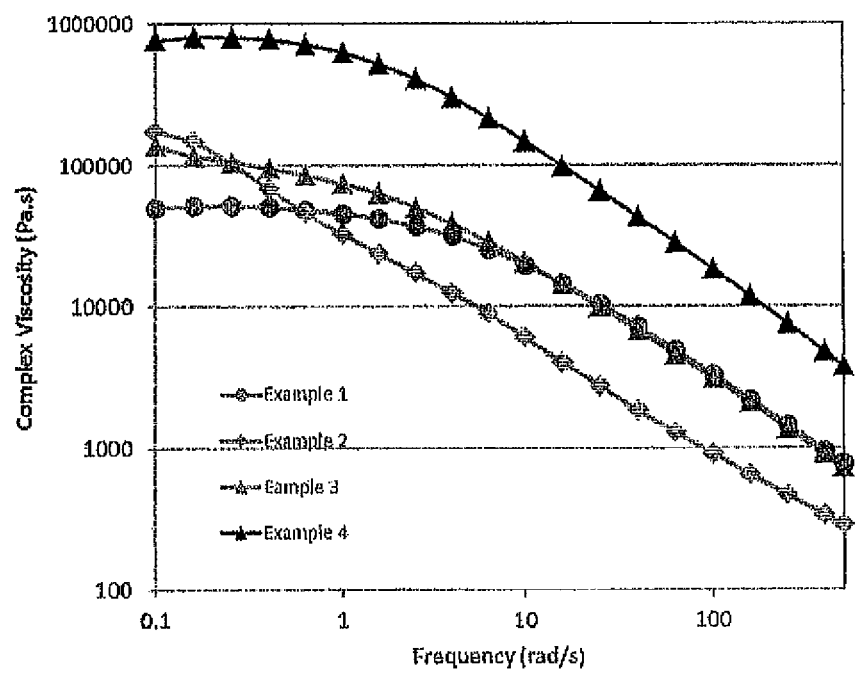
FIG. 5 is a graph showing complex viscosity (Pa*s) versus frequency (rad/s) for the solid-state polymerized samples of Examples 1-4.

As indicated, the use of Compounds A, F, and H in Examples 2-4 resulted in a significant increase in the complex viscosity at a frequency of 0.15 rad/s. Other frequencies were also tested, the results of which are shown in FIG. 5. Furthermore, as evidenced by the ratio of the solid state MV to the prepolymer MV, Compounds F and H significantly accelerated the extent to which melt viscosity was increased during solid-state polymerization. Although the polymerization time was held constant in these experiments, the increased rate at which MV was increased (indicative of an increased rate of prepolymer chain extension) can substantially reduce the solid-state polymerization time needed to achieve a certain molecular weight.

EXAMPLE 6

Melt-extruded sheets were formed from a composition containing 40 wt. % of a mineral filler and a polymers such as described above. The resulting substrates was tested for their mechanical properties. The results are set forth in the table below:

| Sample | Thickness (in) | Width (in) | Flex Modulus (MPa) | Flex Stress (MPa) | Flex Strain (%) |
|---|---|---|---|---|---|
| 1 | 0.027 | 0.593 | 12,472 | 104 | 1.78 |
| 2 | 0.027 | 0.594 | 4,281 | 55 | 3.12 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A melt-extruded substrate that has a thickness of about 20 millimeters or less for use in thermoforming an article, the substrate comprising a polymer composition that includes a thermotropic liquid crystalline polymer polymerized in the presence of an aromatic amide oligomer having the following general formula (I):

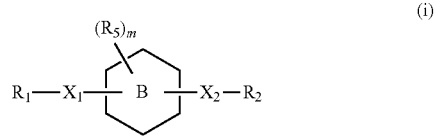

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O);
$R_1$ and $R_2$ are independently selected from aryl, heteroaryl, cycloalkyl, and heterocyclyl.

2. The melt-extruded substrate of claim 1, wherein the polymer has a complex viscosity of about 100 kPa-s or more, determined by a parallel plate rheometer at an angular frequency of 0.15 radians per second, temperature of 375° C., and constant strain amplitude of 1%.

3. The melt-extruded substrate of claim 1, wherein the oligomer has a molecular weight of from about 325 to about 5,000 grams per mole.

4. The melt-extruded substrate of claim 1, wherein ring B is phenyl.

5. The melt-extruded substrate of claim 1, wherein the aromatic amide oligomer has the following general formula (IV):

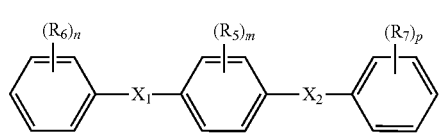

wherein, $X_1$ and $X_2$ are independently C(O)HN or NHC(O);

$R_5$, $R_6$, and $R_7$ are independently selected from halo, haloalkyl, alkyl, alkenyl, aryl, heteroaryl, cycloalkyl, and heterocyclyl;

m is from 0 to 4; and n and p are independently from 0 to 5.

6. The melt-extruded substrate of claim 5, wherein m is 0, n is from 1 to 5, and p is from 1 to 5.

7. The melt-extruded substrate of claim 6, wherein $R_6$, $R_7$, or both are unsubstituted aryl, unsubstituted cycloalkyl, aryl or cylcoalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, aryl, heteroaryl, cycloalkyl, and heterocyclyl.

8. The melt-extruded substrate of claim 6, wherein $R_6$ and $R_7$ are phenyl substituted with —C(O)HN— or —NHC(O)—.

9. The melt-extruded substrate of claim 1, wherein the aromatic amide oligomer has the following general formula (VI):

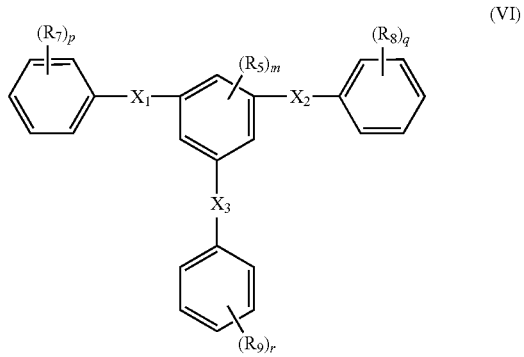

wherein, $X_1$, $X_2$, and $X_3$ are independently C(O)HN or NHC(O);

$R_5$, $R_7$, $R_8$, and $R_9$ are independently selected from halo, haloalkyl, alkyl, alkenyl, aryl, heteroaryl, cycloalkyl, and heterocyclyl;

m is from 0 to 3; and p, q, and r are independently from 0 to 5.

10. The melt-extruded substrate of claim 9, wherein $R_7$, $R_8$, and/or $R_9$ are unsubstituted aryl, unsubstituted cycloalkyl, cycloalkyl or aryl substituted with an amide group having the structure: —C(O)$R_{12}$N— or —N$R_{13}$C(O)—, wherein $R_{12}$ and $R_{13}$ are independently selected from hydrogen, alkyl, alkenyl, aryl, heteroaryl, cycloalkyl, and heterocyclyl.

11. The melt-extruded substrate of claim 10, wherein $R_7$, $R_8$, and/or $R_9$ are phenyl substituted with —C(O)HN— or —NHC(O)—.

12. The melt-extruded substrate of claim 1, wherein the oligomer is selected from the group consisting of the following compounds and combinations thereof:

| Structure | Name |
|---|---|
| | N1,N4-bis(4-benzamidophenyl)terephthalamide |
| | N4-phenyl-N1-[4-[[4-(phenylcarbamoyl)benzoyl]amino]phenyl]terephthalamide |

-continued

| Structure | Name |
|---|---|
| | N4-phenyl-N1-[3-[[4-(phenylcarbamoyl)benzoyl]amino]phenyl]terephthalamide |
| | N1,N3-bis(4-benzamidophenyl)benzene-1,3-dicarboxamide |
| | N3-phenyl-N1-[3-[[3-(phenylcarbamoyl)benzoyl]amino]phenyl]benzene-1,3-dicarboxamide |
| | N1,N3-bis(3-benzamidophenyl)benzene-1,3-dicarboxamide |

-continued

| Structure | Name |
|---|---|
| | N1,N3-bis(4-phenylphenyl)benzene-1,3-dicarboxamide |
| | N1,N3,N5-triphenylbenzene-1,3,5-tricarboxamide |
| | N-(4,6-dibenzamido-1,3,5-triazin-2-yl)benzamide |
| | N1,N3,N5-tris(4-benzamidophenyl)benzene-1,3,5-tricarboxamide |

| Structure | Name |
|---|---|
| 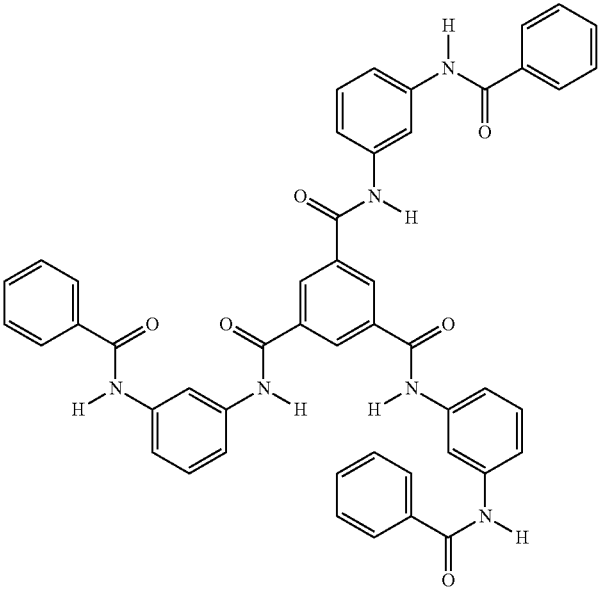 [SMILES: O=C(Nc1cccc(NC(=O)c2cc(C(=O)Nc3cccc(NC(=O)c4ccccc4)c3)cc(C(=O)Nc3cccc(NC(=O)c4ccccc4)c3)c2)c1)c1ccccc1] | N1,N3,N5-tris(3-benzamidophenyl)benzene-1,3,5-tricarboxamide. |

13. The melt-extruded substrate of claim 1, wherein the oligomer contains from 3 to 8 amide functional groups per molecule.

14. The melt-extruded substrate of claim 1, wherein the liquid crystalline polymer is wholly aromatic.

15. The melt-extruded substrate of claim 1, wherein the liquid crystalline polymer contains monomer repeat units derived from one or more aromatic hydroxycarboxylic acids, aromatic dicarboxylic acids, aromatic diols, aromatic amines, aromatic diamines, or a combination of the foregoing.

16. The melt-extruded substrate of claim 1, wherein the liquid crystalline polymer contains monomer repeat units derived from 4-hydroxybenzoic acid, 6-hydroxy-2-naphthoic acid, terephthalic acid, isophthalic acid, 4,4'-biphenol, hydroquinone, acetaminophen, or a combination of the foregoing.

17. The melt-extruded substrate of claim 1, wherein the aromatic amide oligomer is employed in an amount of from about 0.1 to about 10 parts by weight relative to 100 parts by weight of the liquid crystalline polymer.

18. The melt-extruded substrate of claim 1, wherein the liquid crystalline polymer is melt-polymerized in the presence of the aromatic amide oligomer and thereafter solid-state polymerized.

19. The melt-extruded substrate of claim 1, wherein the polymer composition further comprises a mineral filler.

20. The melt-extruded substrate of claim 1, wherein the polymer composition has a melting temperature of from about 250° C. to about 400° C.

21. The melt-extruded substrate of claim 1, wherein the polymer composition has a melt viscosity of from about 10 to about 300 Pa-s, determined in accordance with ISO Test No. 11443 at a temperature of 375° C. and at a shear rate of 1000 s$^{-1}$.

22. The melt-extruded substrate of claim 1, wherein the polymer composition has a heat of crystallization of about 3.3 J/g or more, determined in accordance with ISO Test No. 11357.

23. The melt-extruded substrate of claim 1, wherein the substrate has a thickness of from about 0.1 to about 10 millimeters.

24. A three-dimensional article that is shaped from the melt-extruded substrate of claim 1.

25. The three-dimensional article of claim 24, wherein the article is a cooking article.

26. A method for forming a three-dimensional article, the method comprising:
heating the melt-extruded substrate of any of the foregoing claims; and
shaping the heated substrate into a three-dimensional article.

27. The method of claim 26, wherein the heated substrate is shaped with a vacuum mold.

28. A method for forming a thin substrate having a thickness of about 20 millimeters or less, the method comprising:
extruding a polymer composition to produce a precursor sheet; and
thereafter, calendaring the precursor sheet to form a thin substrate, wherein the polymer composition includes a thermotropic liquid crystalline polymer polymerized in the presence of an aromatic amide oligomer having the following general formula (I):

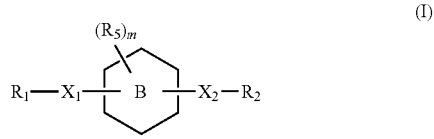

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O);

$R_1$ and $R_2$ are independently selected from aryl, heteroaryl, cycloalkyl, and heterocyclyl.

29. The method of claim 28, wherein the polymer composition is extruded at a temperature that is equal to the melting temperature of the polymer composition or within a range of about 20° C. above or below the melting temperature of the polymer composition.

* * * * *